(12) United States Patent
Schulte Strathaus et al.

(10) Patent No.: US 11,034,526 B2
(45) Date of Patent: Jun. 15, 2021

(54) CONVEYOR BELT STRIPPING DEVICE AND DISPLACEMENT GUIDE FOR THE SAME

(71) Applicant: Schulte Strathaus GmbH & Co. KG Fördertechnik Dichtungssysteme, Werl (DE)

(72) Inventors: Michael Schulte Strathaus, Wickede (DE); Sebastian Sudhoff, Dortmund (DE)

(73) Assignee: Schulte Strathaus GmbH & Co. KG Fördertechnik Dichtungssysteme, Werl (DE)

(*) Notice: Subject to any disclaimer, the term of this patent is extended or adjusted under 35 U.S.C. 154(b) by 0 days.

(21) Appl. No.: 16/639,618

(22) PCT Filed: Apr. 3, 2019

(86) PCT No.: PCT/EP2019/058404
§ 371 (c)(1),
(2) Date: Feb. 17, 2020

(87) PCT Pub. No.: WO2020/200441
PCT Pub. Date: Oct. 8, 2020

(65) Prior Publication Data
US 2021/0107747 A1 Apr. 15, 2021

(51) Int. Cl.
*B65G 45/12* (2006.01)
*B65G 45/14* (2006.01)
*B65G 45/16* (2006.01)

(52) U.S. Cl.
CPC ............. *B65G 45/16* (2013.01); *B65G 45/14* (2013.01)

(58) Field of Classification Search
CPC ......... B65G 45/12; B65G 45/14; B65G 45/16
(Continued)

(56) References Cited

U.S. PATENT DOCUMENTS 4,533,036 A * 8/1985 Gordon .................. B65G 45/16
15/256.51
4,662,507 A * 5/1987 Veenhof ................. B65G 45/12
15/256.5
(Continued)

FOREIGN PATENT DOCUMENTS

DE 202009004182 U1 8/2010
DE 202012010945 U1 1/2013
(Continued)

OTHER PUBLICATIONS

International Search Report for International Application No. PCT/EP2019/058404, dated Nov. 28, 2019.
(Continued)

*Primary Examiner* — Douglas A Hess
(74) *Attorney, Agent, or Firm* — Jason H. Vick; Sheridan Ross, PC

(57) ABSTRACT

The invention relates to a conveyor belt stripping device for a conveyor belt of a conveyor system, having a support shaft and at least two displacement guides which are arranged side by side on the support shaft in a positive locking manner so as to transmit torque. Each of the two displacement guides is displaceable in the longitudinal direction of the support shaft once a fastening device has been released and is connected to a holding end of a stripping segment, wherein the stripping segment comprises a stripping end which is spaced from the holding end and is movable to abut the conveyor belt. The two displacement guides are operatively couplable together in the longitudinal direction of the support shaft by means of a connection device. The one displacement guide, in the state coupled with the other displacement guide, is displaceable along the longitudinal direction of the support shaft to a predefined distance from the other displacement guide and then is displaceable along the longitudinal direction of the support shaft at the pre-
(Continued)

Figure 1:
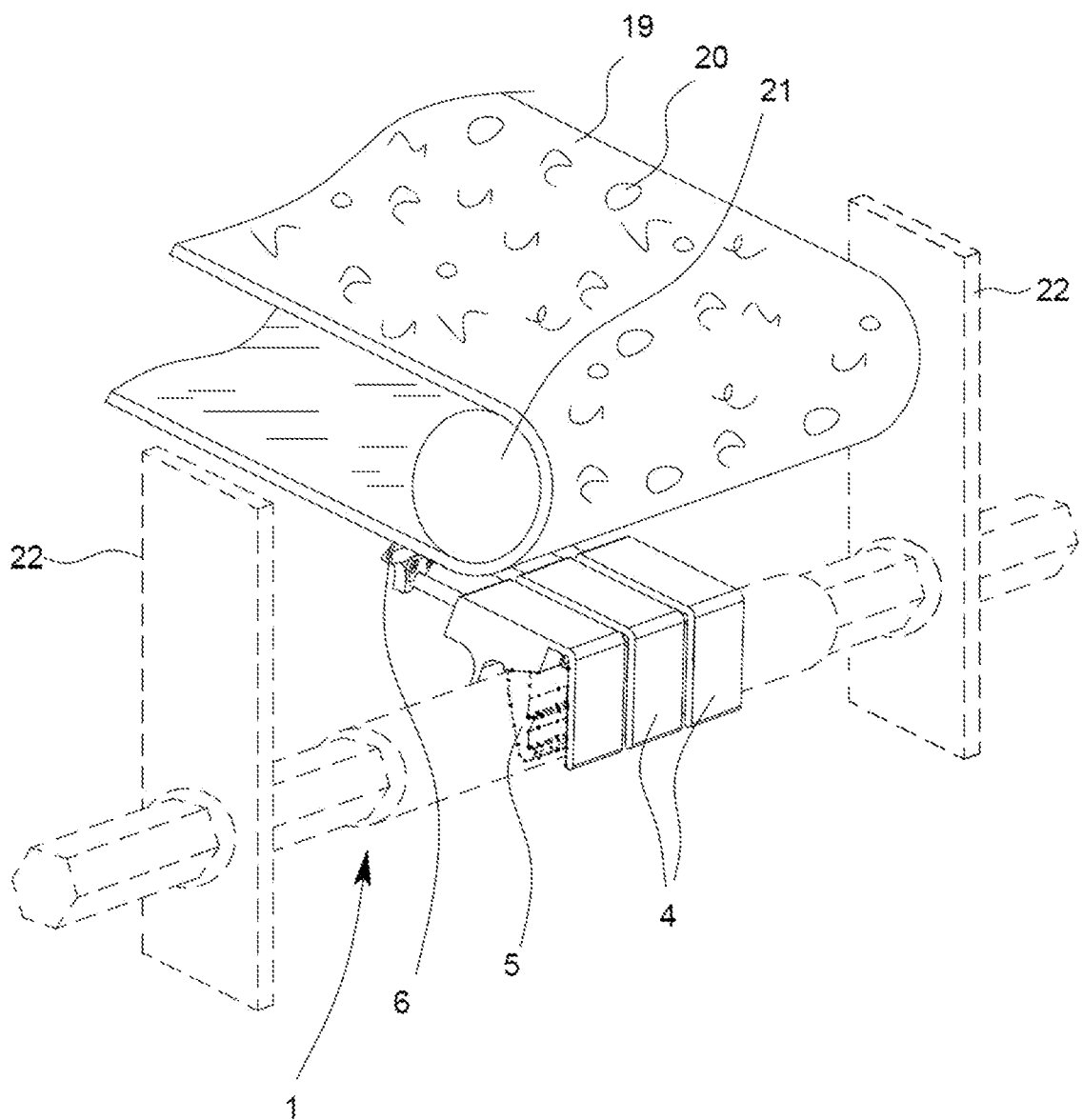

defined distance to the other displacement guide together with the other displacement guide on account of the coupling by means of the connection device.

The invention also relates to a displacement device for the attachment of a stripping segment to a support shaft of a conveyor belt stripping device.

26 Claims, 20 Drawing Sheets

(58) Field of Classification Search
USPC .................................... 198/467, 468, 499
See application file for complete search history.

(56) References Cited

U.S. PATENT DOCUMENTS

| | | | | |
|---|---|---|---|---|
| 4,821,867 A * | 4/1989 | Veenhof | ............... | B65G 45/12 15/256.5 |
| 5,014,844 A * | 5/1991 | Anttonen | ............... | B65G 45/16 198/499 |
| 5,222,588 A * | 6/1993 | Gordon | ............... | B65G 45/12 198/497 |
| 5,301,797 A * | 4/1994 | Hollyfield, Jr. | ........ | B65G 45/16 198/499 |
| 6,581,754 B2 * | 6/2003 | Law | ............... | B65G 45/12 15/256.51 |
| 7,987,966 B2 * | 8/2011 | DeVries | ............... | B65G 45/16 198/497 |
| 8,167,114 B2 * | 5/2012 | Khanania | ............... | B65G 45/16 198/499 |
| 8,245,836 B2 * | 8/2012 | Kotze | ............... | B65G 45/16 198/499 |
| 8,393,459 B2 * | 3/2013 | Childs | ............... | B65G 45/12 198/497 |
| 8,528,724 B2 * | 9/2013 | Dunnwald | ............... | B65G 45/16 198/499 |
| 9,469,484 B2 * | 10/2016 | Kishor | ............... | B65G 45/16 |
| 9,617,081 B2 * | 4/2017 | Dunnwald | ............... | B65G 45/12 |
| 9,731,906 B2 * | 8/2017 | Strathaus | ............... | B65G 45/16 |
| 2016/0167892 A1 | 6/2016 | Kishor et al. | | |
| 2017/0174441 A1 | 6/2017 | Strathaus | | |

FOREIGN PATENT DOCUMENTS

| | | |
|---|---|---|
| DE | 202014007229 U1 | 7/2015 |
| DE | 202017003979 U1 | 11/2018 |
| EP | 2108602 A1 | 10/2009 |
| GB | 1578582 A | 11/1980 |
| GB | 2227991 A | 8/1990 |

OTHER PUBLICATIONS

Written Opinion for International Application No. PCT/EP2019/058404, dated Nov. 28, 2019.

* cited by examiner

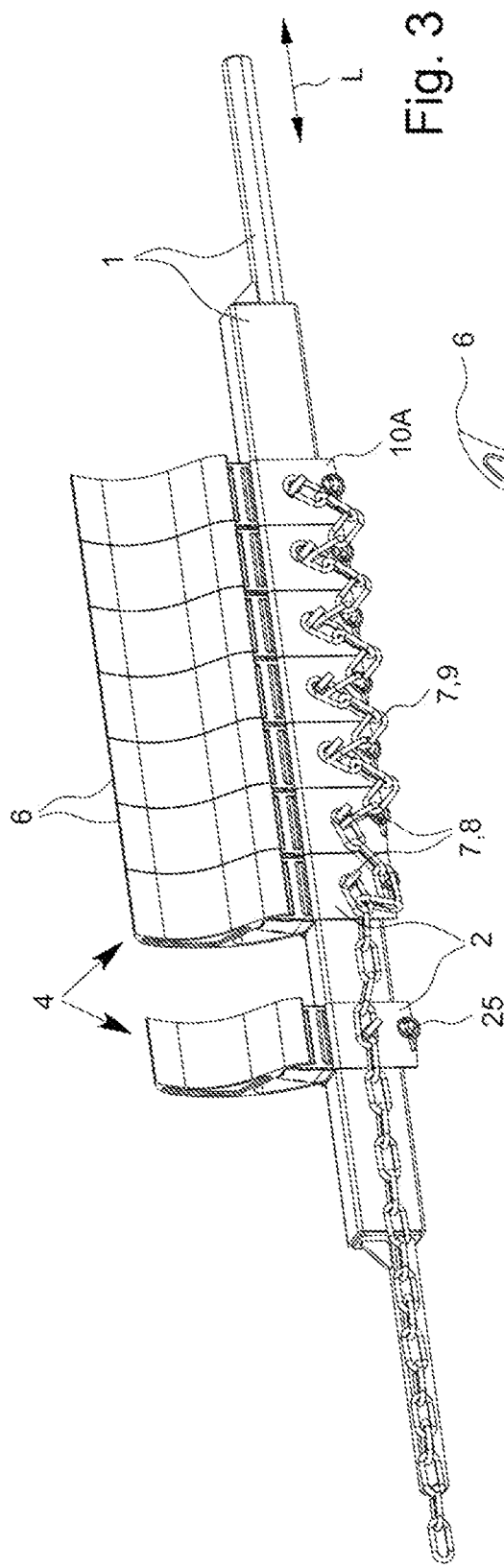
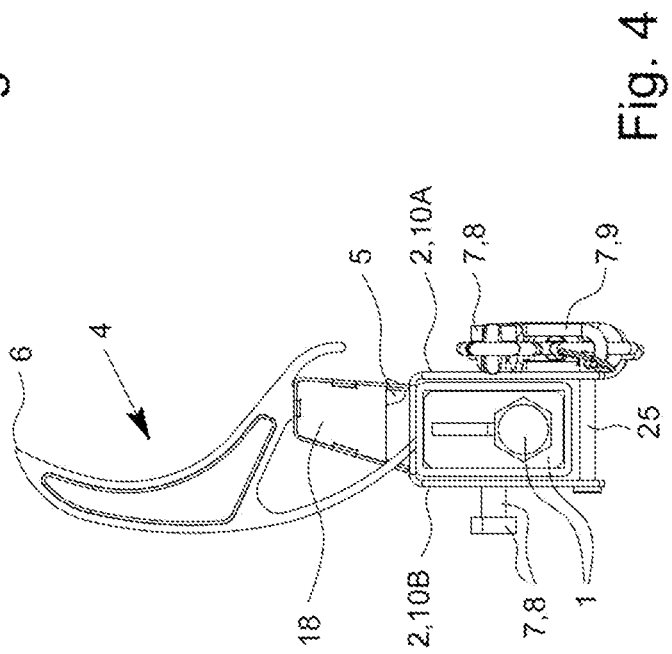

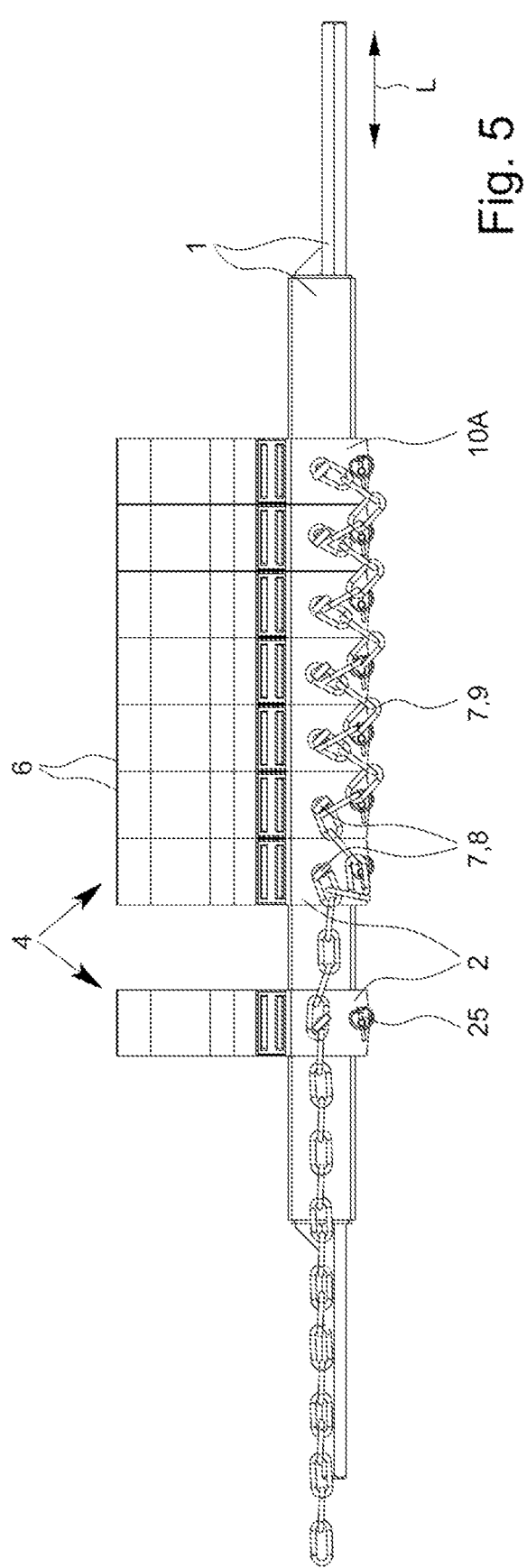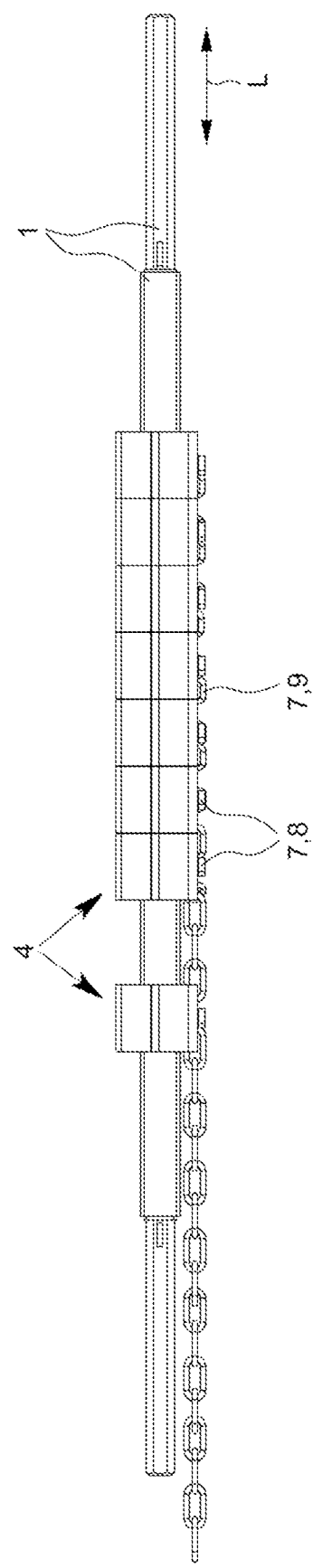

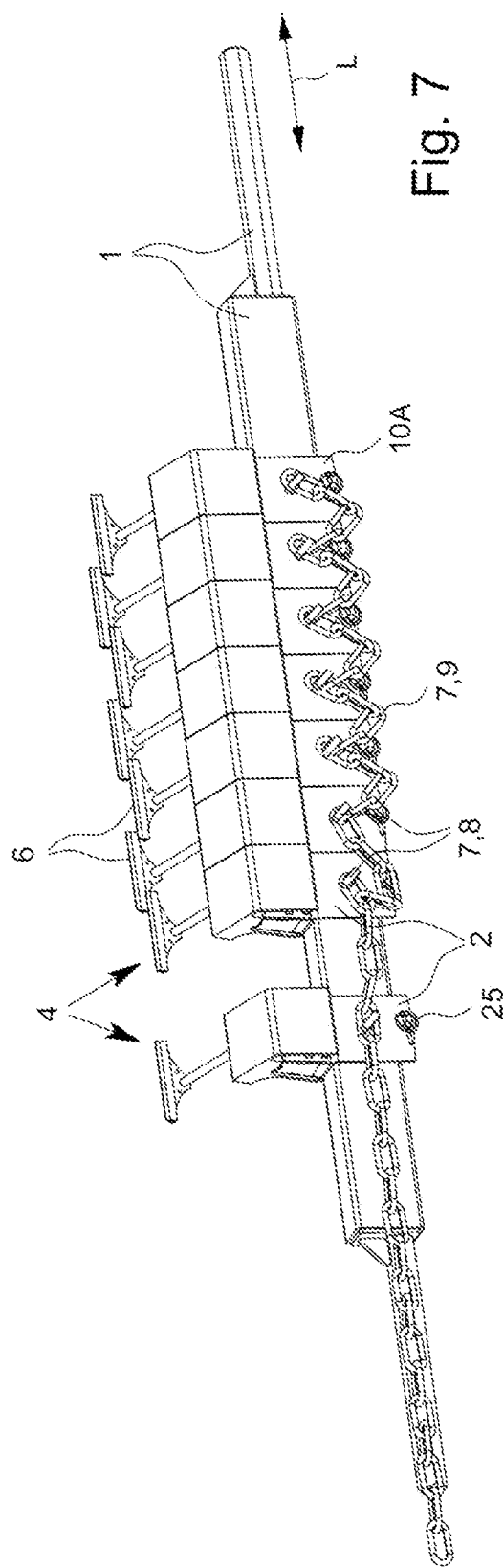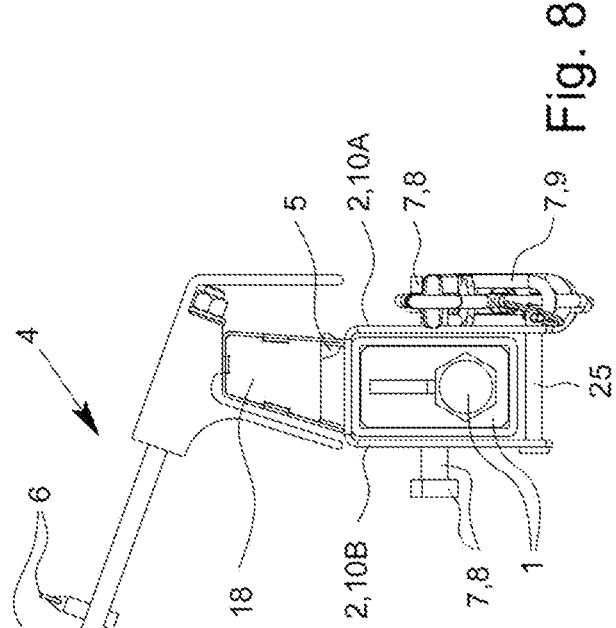

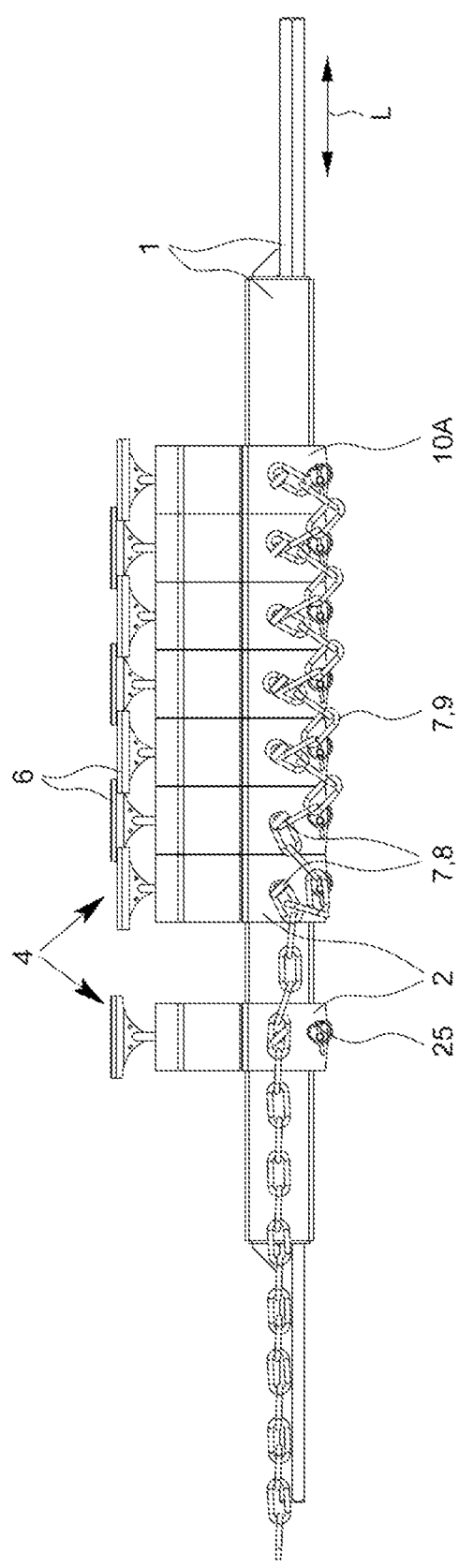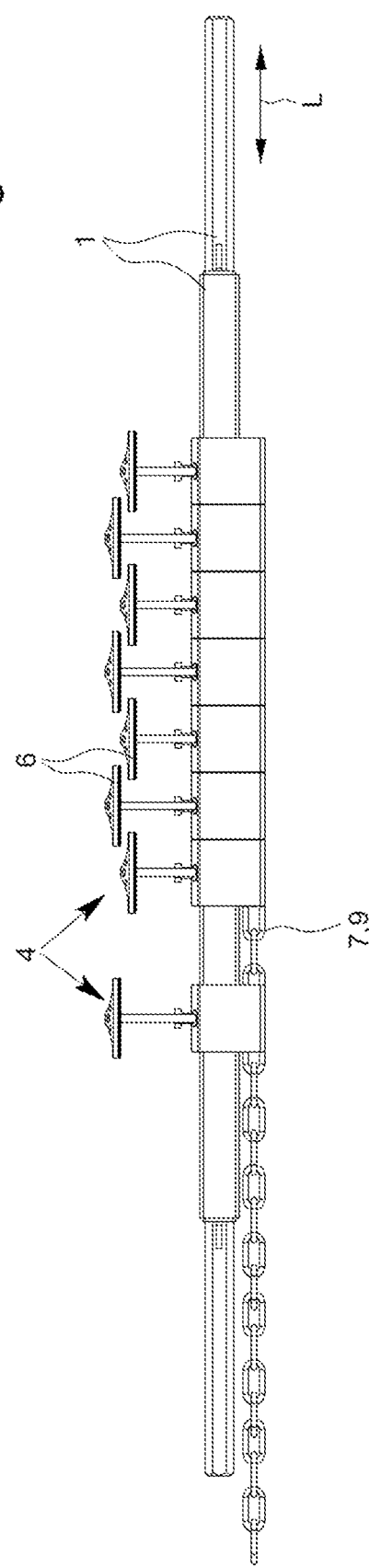

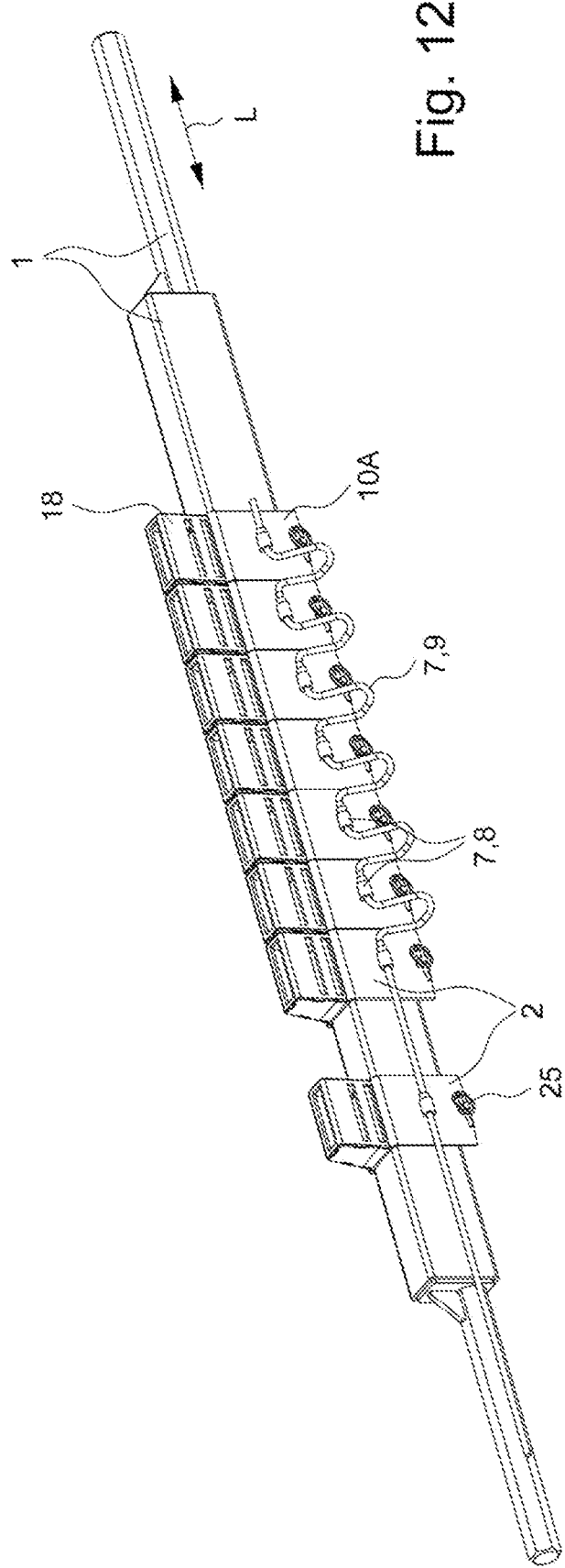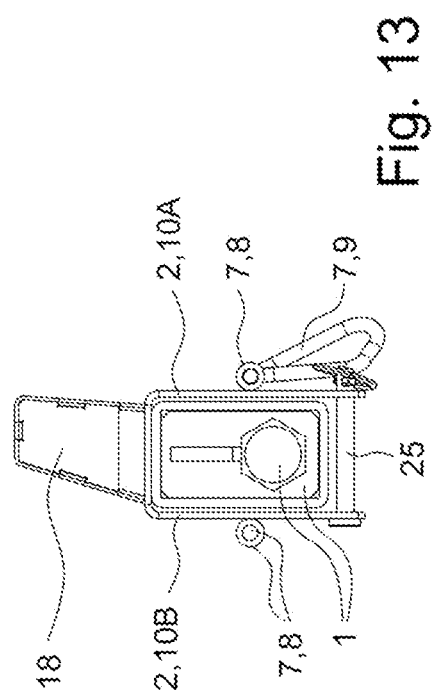

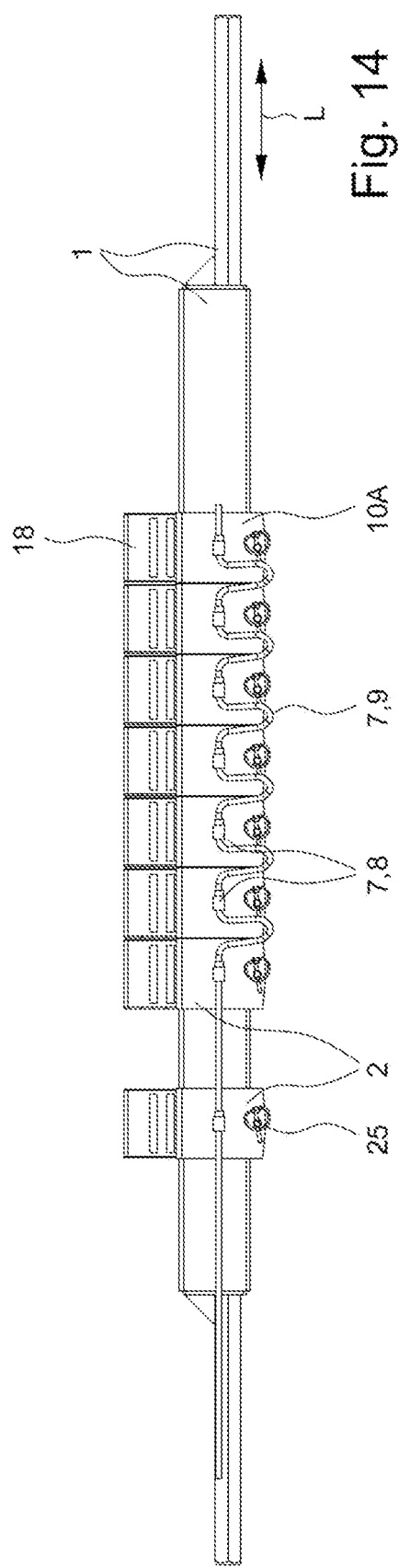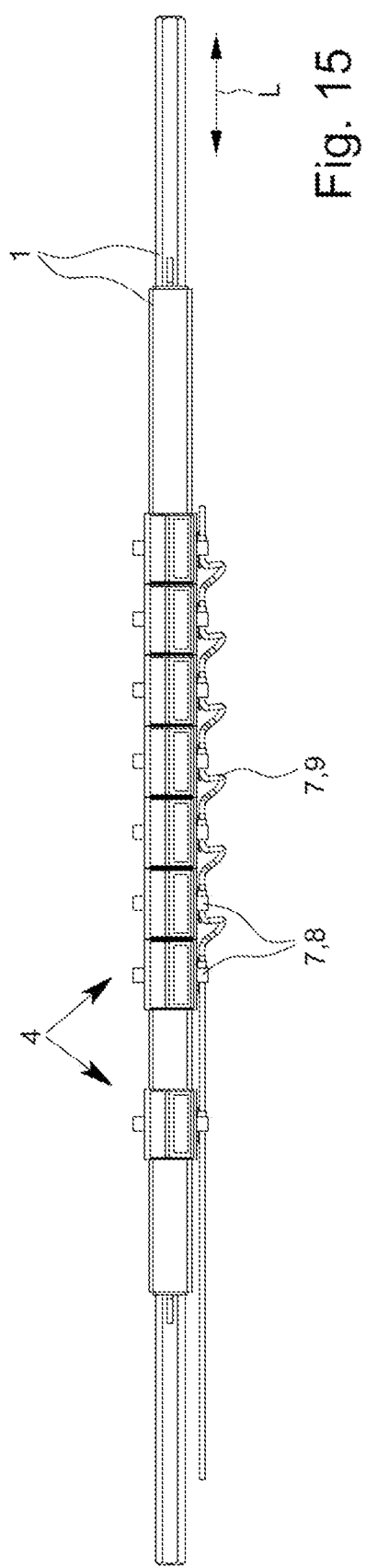

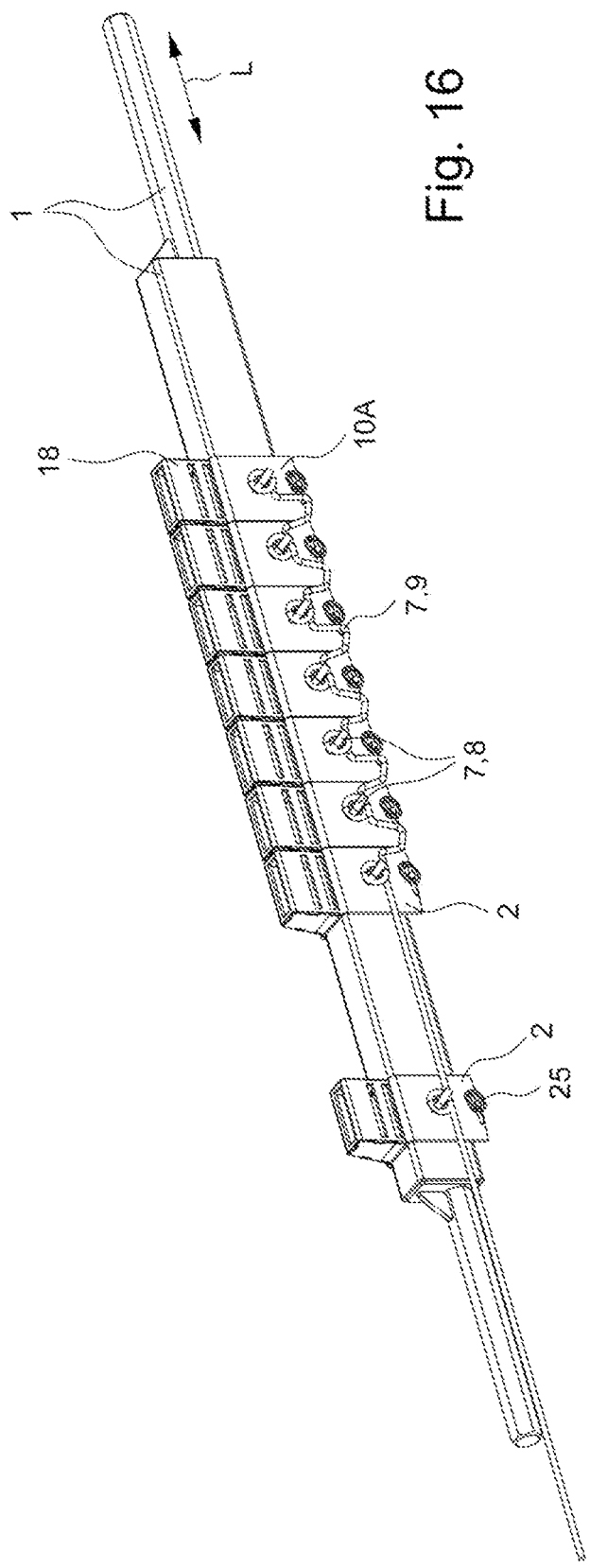
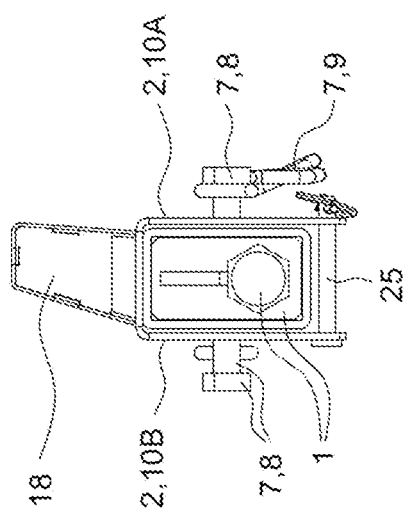
Fig. 16
Fig. 17

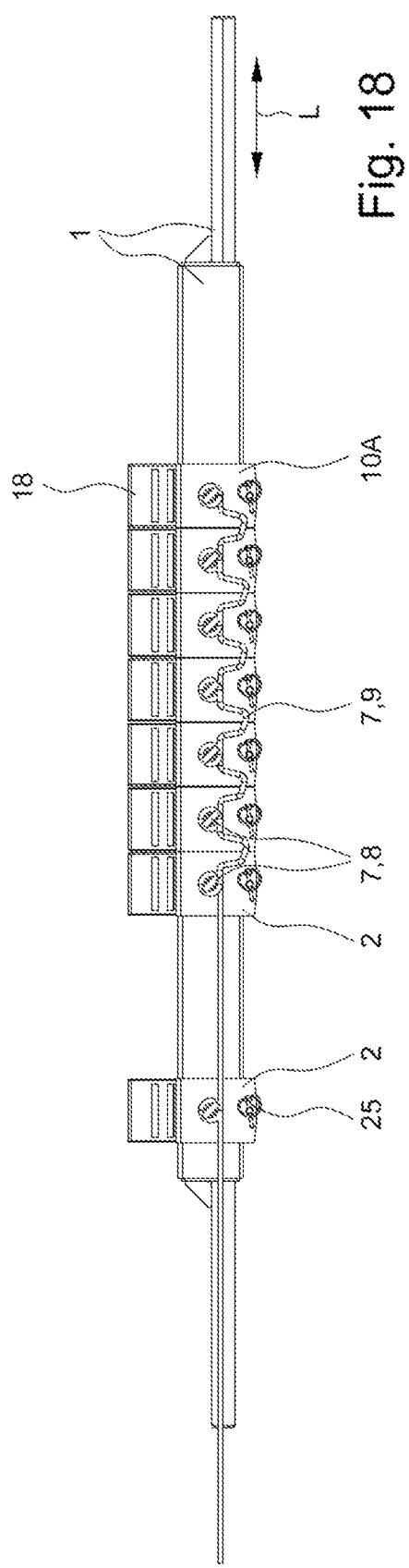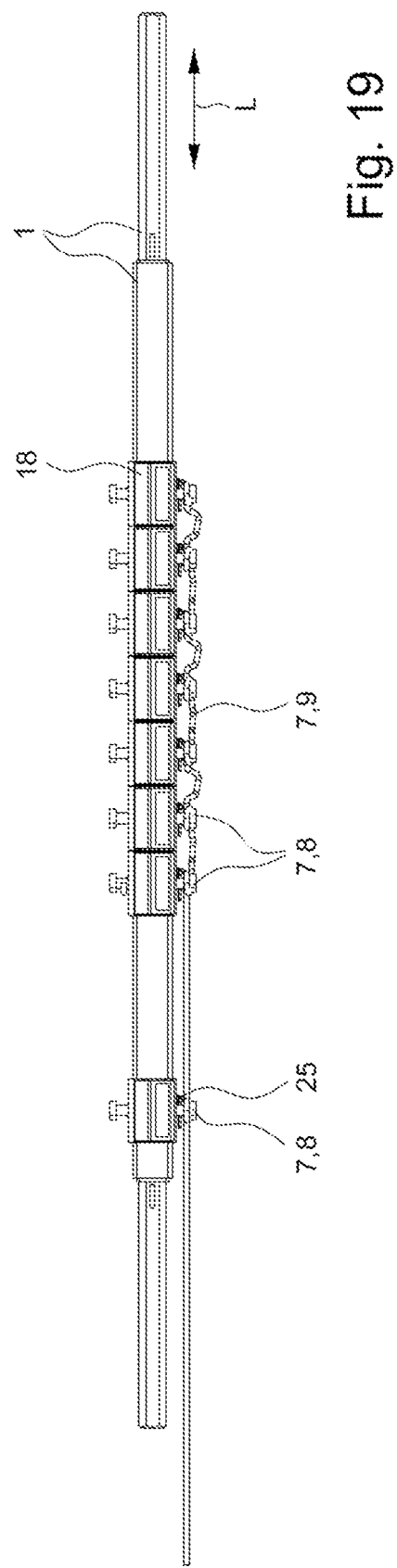

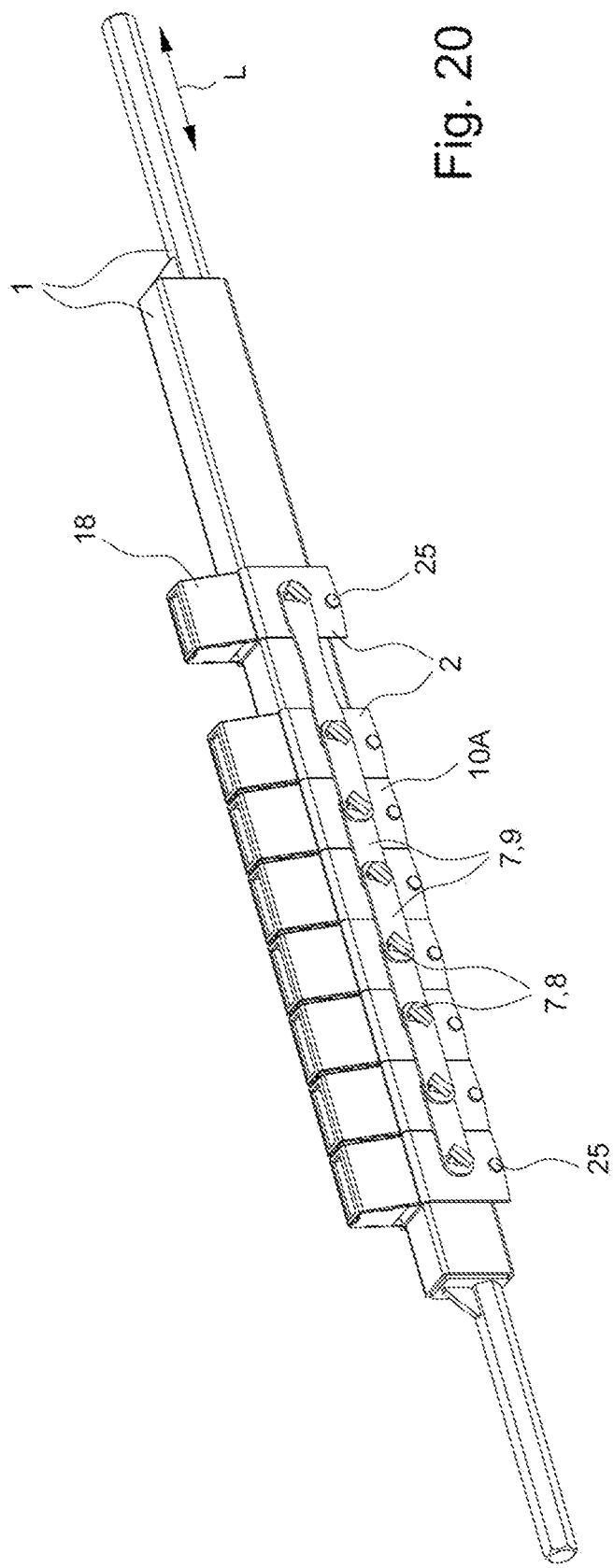
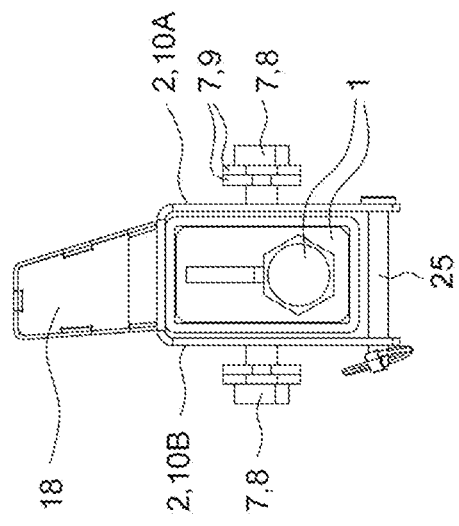

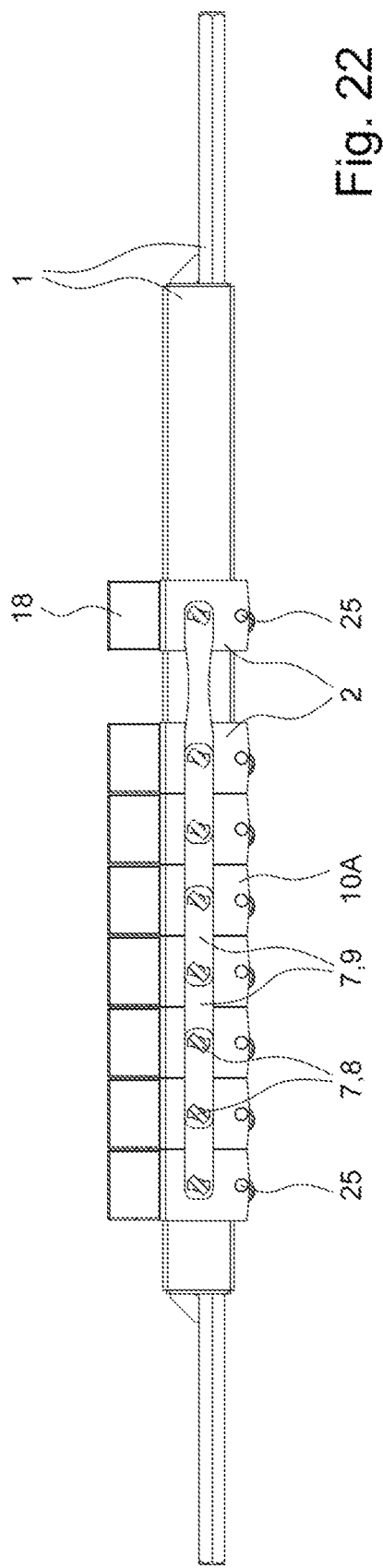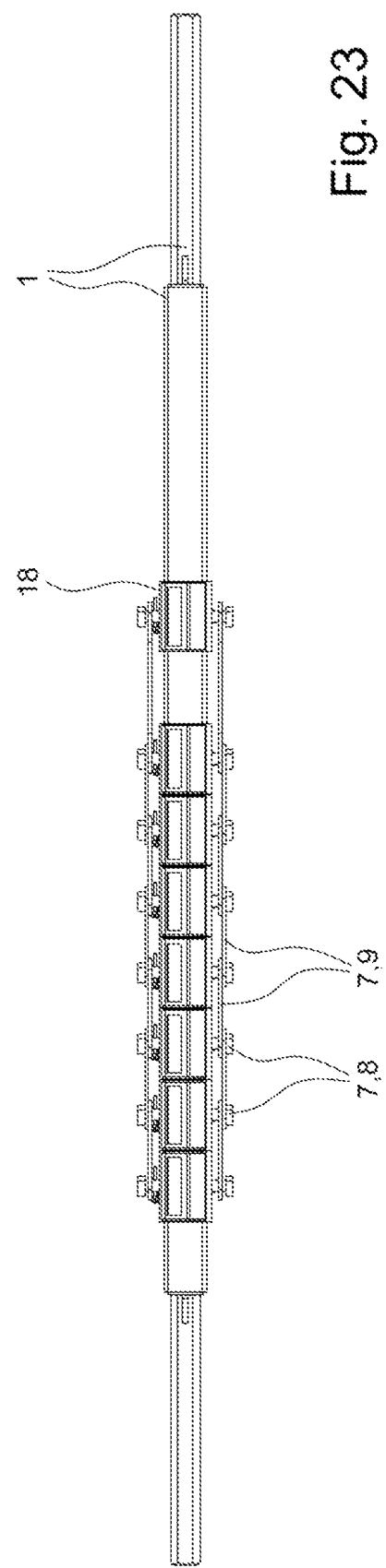

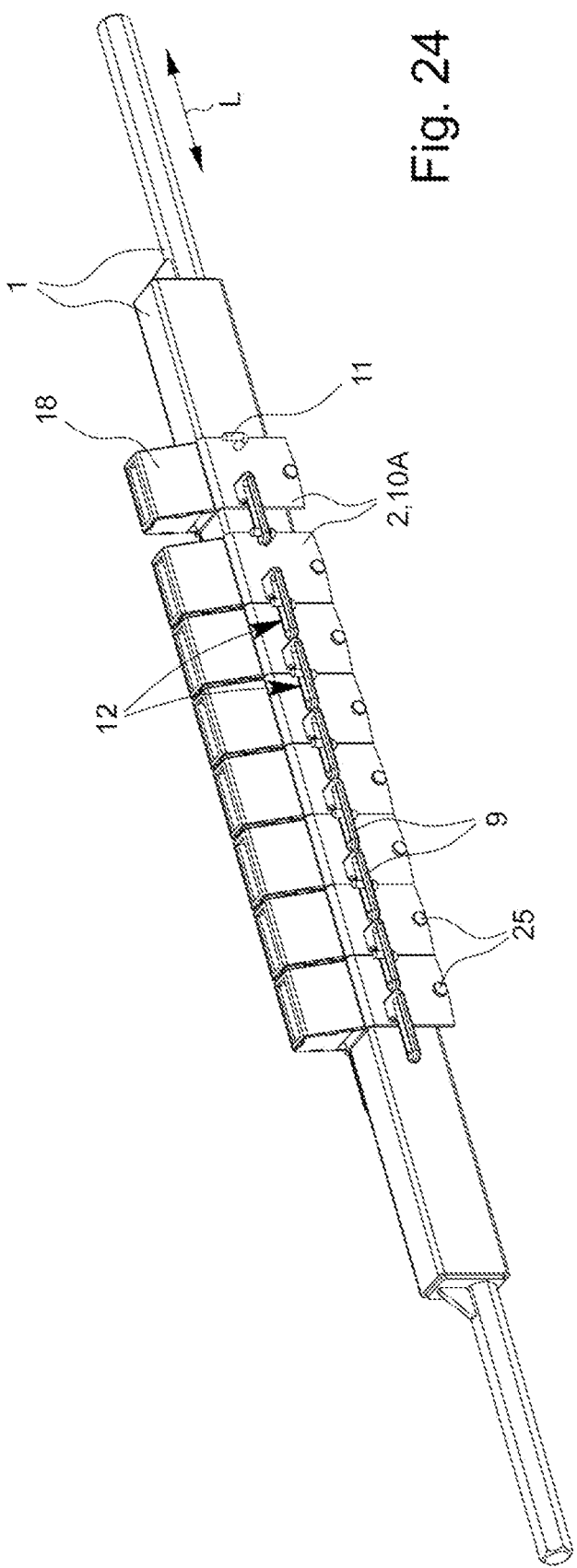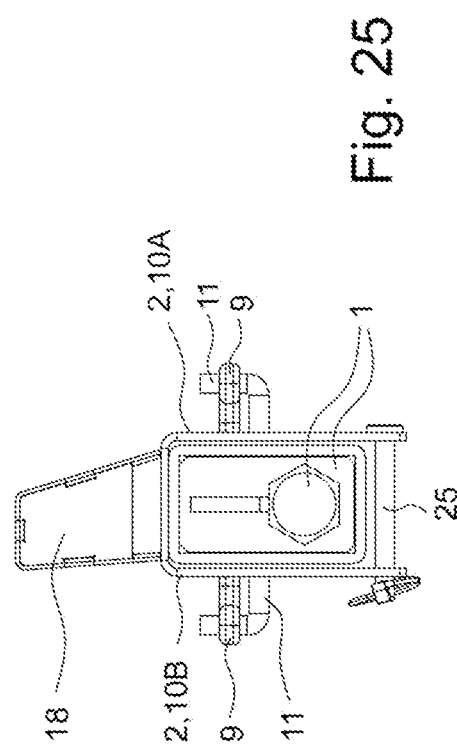

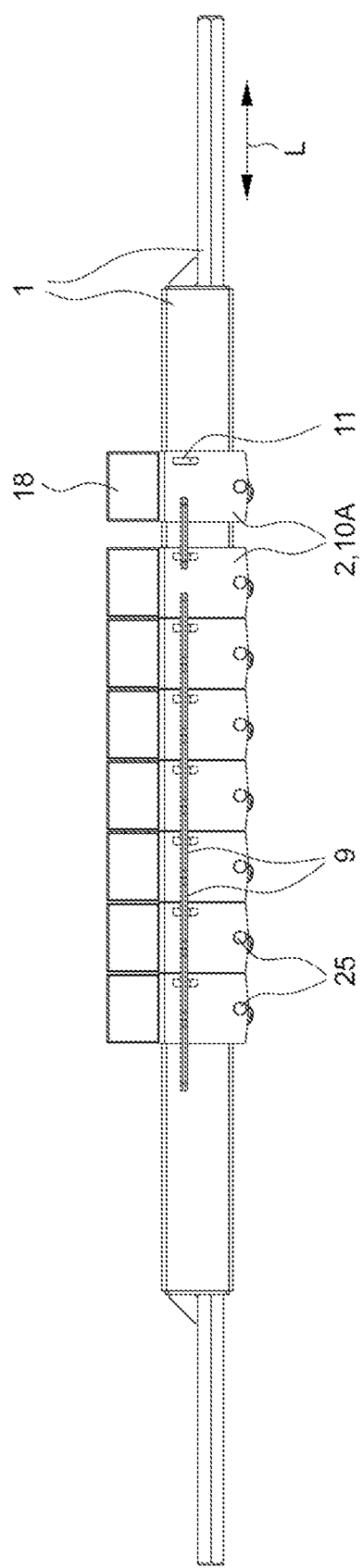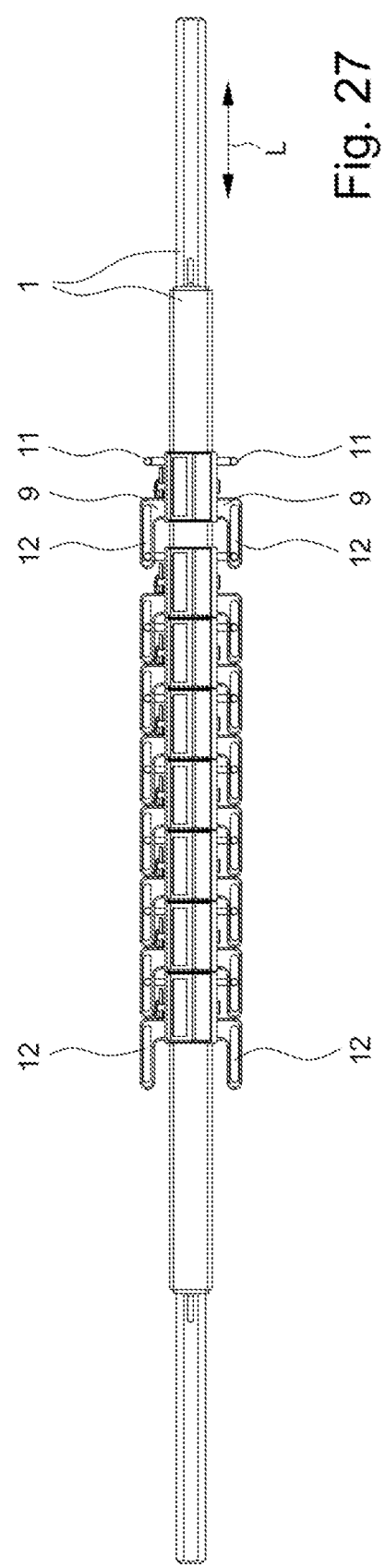

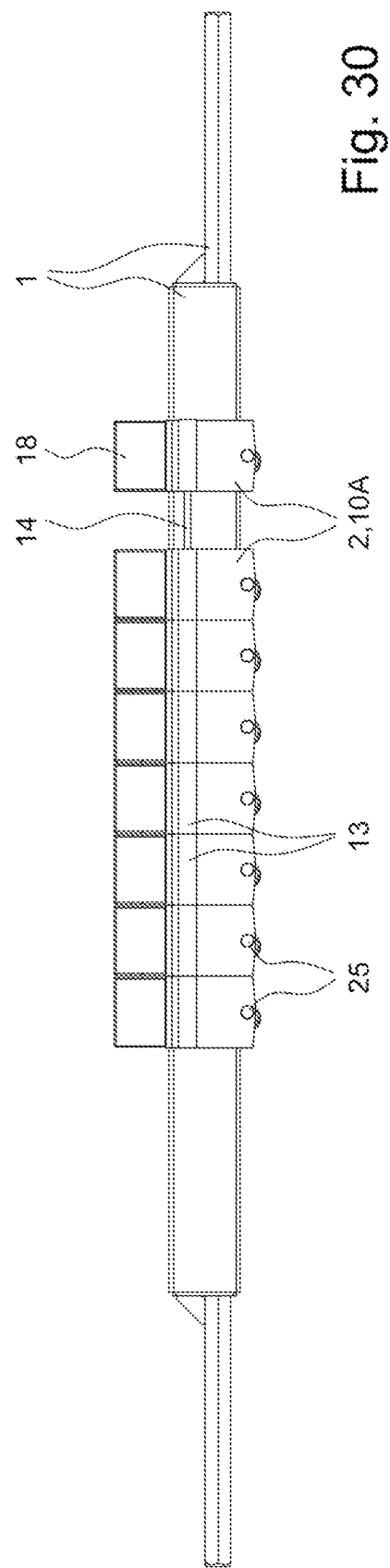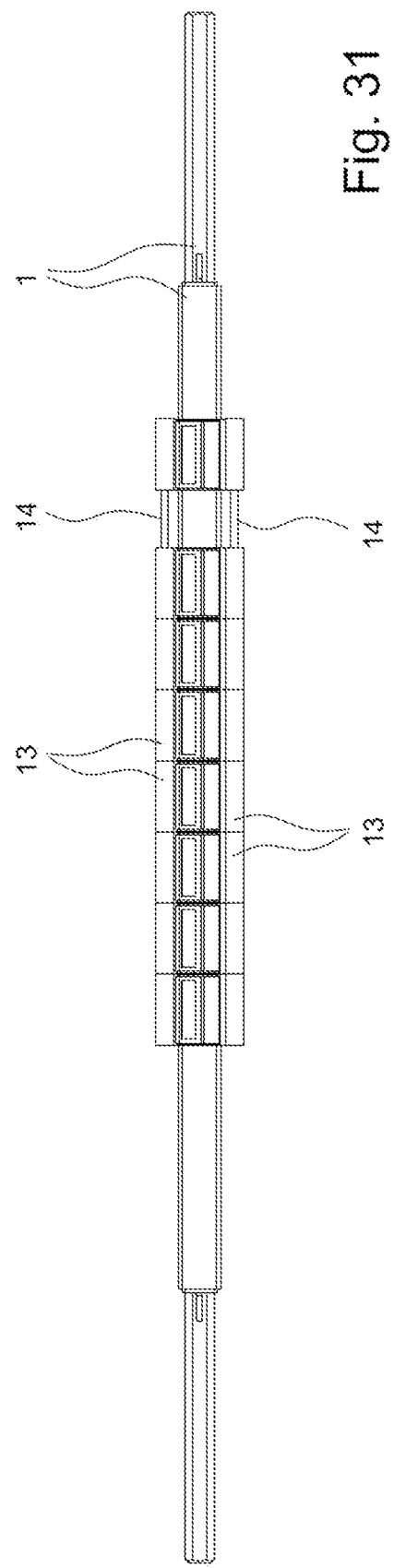

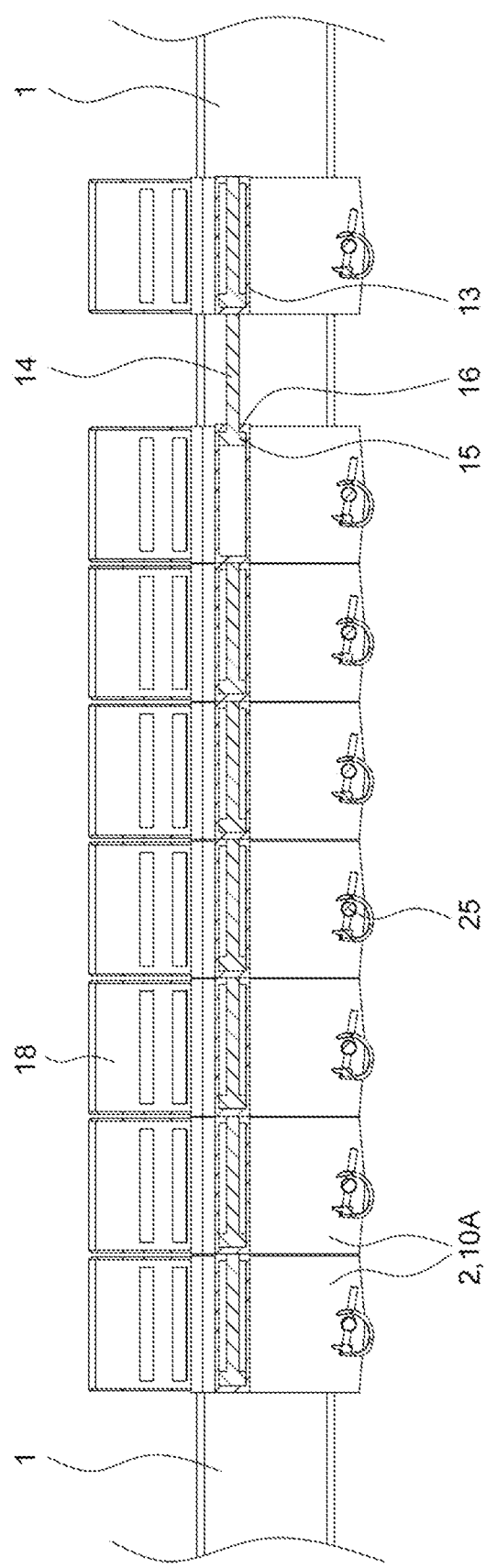

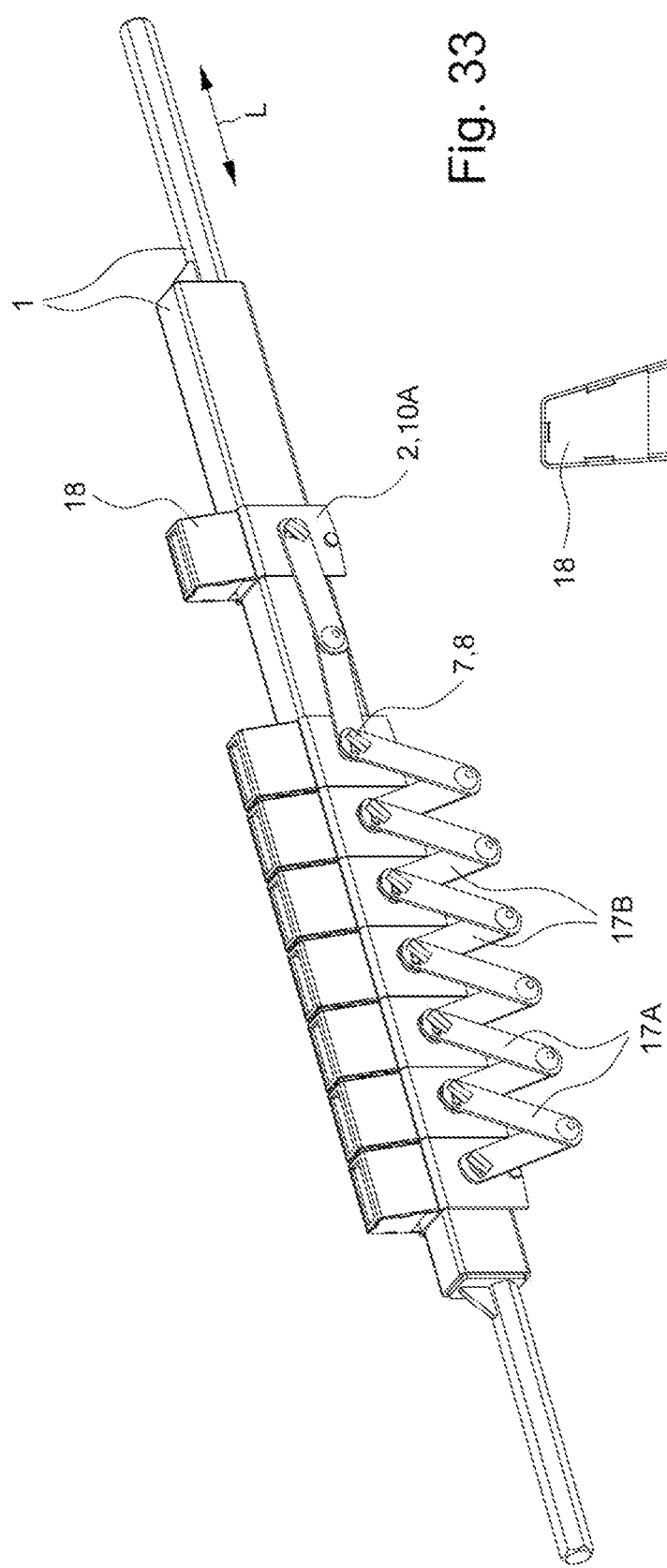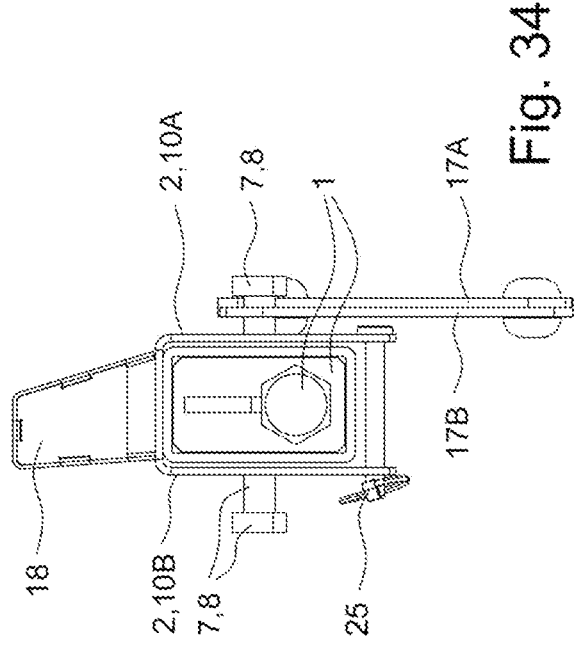

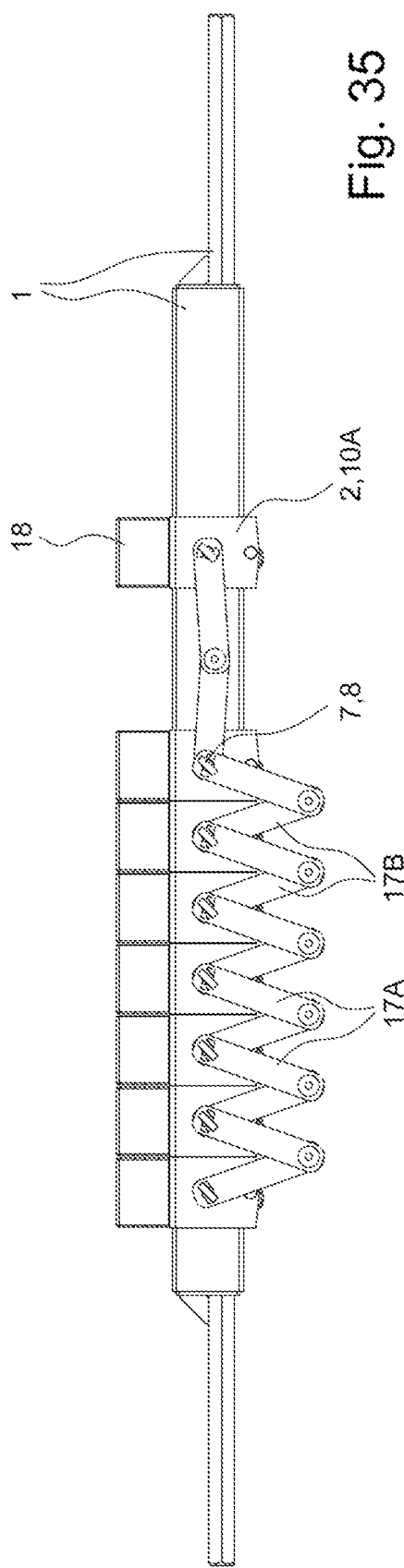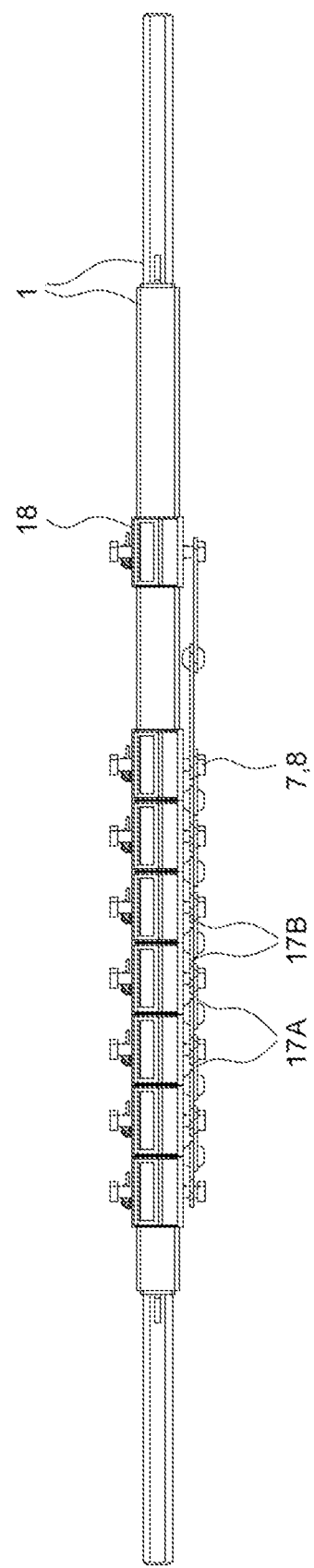

CONVEYOR BELT STRIPPING DEVICE AND DISPLACEMENT GUIDE FOR THE SAME

CROSS REFERENCE TO RELATED APPLICATIONS

This application is a national stage application under 35 U.S.C. 371 of PCT Application No. PCT/EP2019/058404 having an international filing date of 3 Apr. 2019, which designated the United States, the entirety of which are incorporated herein by reference.

The invention relates to a conveyor belt stripping device for a conveyor belt of a conveyor system and to a component of such a conveyor belt stripping device, namely a displacement guide for the attachment of a stripping segment to a support shaft of such a conveyor belt stripping device.

Conveyor systems use a moving conveyor belt for transporting bulk material, such as sand, gravel and coal, from one location to another location. When the bulk material falls down from the conveyor belt at a deflection roller at the end, sometimes residual bulk material sticks to the conveyor belt. A conveyor belt stripping device of the type discussed serves for the purpose of stripping the remaining bulk material adhering to the conveyor belt.

A first conveyor belt stripping device is normally situated directly at the deflection roller of the conveyor belt as a so-called primary stripper. A secondary stripper is mostly also situated downstream of the primary stripper in the running direction of the conveyor belt on the lower run of the conveyor belt.

The mostly multiple stripping segments of a conveyor belt stripping device, which stripping segments are arranged side by side, are fastened in an interchangeable manner to a support shaft which is mostly rotatable, frequently additionally also linearly adjustable and extends transversely to the conveyor belt.

A tensioning device or in each case one tensioning device, which comprises a lever structure or prestressed springs in order to generate the necessary prestressing, is connected to one or to both ends of the support shaft. Occasionally, a tensioning device also comprises a drive motor. The drive motor is then actuated by an electric or electronic control unit.

An example of a conveyor belt stripping device of the type discussed is the object of document DE 20 2014 007 229 U1. Variants for the attachment of stripping segments to a support shaft of a conveyor belt stripping device can additionally be found in the prior art in DE 20 2009 004 182 U1 and DE 20 2012 010 945 U1.

The starting point for the teaching of the present invention is a conveyor belt stripping device where improved interchangeability of the stripping segments has already been realized. (DE 20 2017 003 979 U1).

A stripping segment for attaching to a support shaft of the conveyor belt stripping device is provided in the case of said conveyor belt stripping device. The stripping segment has a holding end, which is connectable to the support shaft in a positive locking manner and transmits torque, and a stripping end which is spaced therefrom and is movable into abutment with the conveyor belt. A displacement guide is integrally realized at the holding end. As an alternative to this, the holding end can be releasably connected to a displacement guide. By means of the displacement guide, the stripping segment is attachable to the support shaft in a positive locking manner so as to transmit torque and so as to be displaceable in the longitudinal direction of the support shaft. The holding end and the displacement guide comprise transverse sides which, in the state where the stripping segment is attached to the support shaft, extend transversely to the longitudinal direction of the support shaft. The stripping segment comprises, on both transverse sides, connection elements, by way of which two stripping segments arranged side by side on the support shaft are operatively couplable together in the longitudinal direction.

The stripping segments, when they are attached to the support shaft side by side, are all coupled together in this way. As a result, it is possible to remove the stripping segments from the support shaft in the longitudinal direction by pulling only on the foremost one, that is to say the laterally outermost stripping segment under the conveyor belt or the displacement guide thereof. All coupled stripping segments are entrained when the foremost stripping segment is pulled out in this way. When one stripping segment has been pulled out so far that it is no longer connected to the support shaft, it can be decoupled from the remaining coupled stripping segments and removed individually to the side. In practice, it has been shown that the forces to be applied when pulling laterally on all stripping segments that are connected together are very high. This naturally applies all the more the higher the number of coupled stripping segments and the heavier the coupled stripping segments. Particularly high forces are to be applied in the typical case where the stripping segments are contaminated as a result of stripping bulk materials. Here, the contamination frequently gives rise to high connection forces between the stripping segments amongst themselves and/or between the stripping segments and the support shaft.

The problem underlying the teaching of the present invention is consequently to improve the previously described conveyor belt stripping device with regard to manageability.

The problem presented previously is solved by a conveyor belt stripping device according to Claim 1. Preferred designs and further developments of the conveyor belt stripping device according to the invention are the object of the relevant subclaims.

The conveyor belt stripping device according to Claim 1 has a support shaft and at least two displacement guides which are arranged side by side on the support shaft in a positive locking manner so as to transmit torque. Each of the two displacement guides is displaceable in the longitudinal direction of the support shaft once a fastening device has been released and is connected to a holding end of a stripping segment, wherein the stripping segment comprises a stripping end which is spaced from the holding end and is movable to abut the conveyor belt. The two displacement guides are operatively couplable together in the longitudinal direction of the support shaft by means of a connection device.

The basic idea of the present invention consists in designing the conveyor belt stripping device in such a manner that the one displacement guide is able to be spatially removed from the displacement guide coupled with it and, where applicable, further displacement guides coupled with the other displacement guide (and consequently also the respective stripping segments), whilst the one displacement guide is arranged on the support shaft, in particular on a centre piece of the support shaft, preferably without displacing the displacement guides that are still coupled. The displacement guides are therefore separable into singles as it were still on the support shaft. This improves the manageability of the conveyor belt stripping device. In particular, the forces to be applied for singling out a stripping segment are lower than the forces to be applied for displacing all coupled stripping segments. What is more, where the stripping segments are contaminated, the forces to be applied for displacing individual stripping segments are lower than the forces to be applied for displacing all coupled stripping segments.

To this end, the one displacement guide, in the state coupled with the other displacement guide, is displaceable along the longitudinal direction of the support shaft to a predefined distance from the other displacement guide and then is displaceable along the longitudinal direction of the support shaft at the predefined distance to the other displacement guide together with the other displacement guide on account of the coupling by means of the connection device.

The one of the two displacement guides, in the state coupled with the other displacement guide, is preferably displaceable by means of the connection device along the longitudinal direction of the support shaft to the predefined distance from the other displacement guide and then is displaceable by means of the connection device along the longitudinal direction of the support shaft at the predefined distance to the other displacement guide together with the other displacement guide on account of the coupling by means of the connection device.

In a preferred manner, one of the two displacement guides, in the state coupled with the other displacement guide, is displaceable as a result of exertion of a tensile force on the one displacement guide along the longitudinal direction of the support shaft to the predefined distance from the other displacement guide and then is displaceable as a result of exertion of a tensile force on the one displacement guide by means of the connection device along the longitudinal direction of the support shaft at the predefined distance to the other displacement guide together with the other displacement guide in the direction of the tensile force on account of the coupling by means of the connection device.

The connection device can be fixed to both displacement guides, in particular by means of a fixing element of the connection device.

The connection device can have a connection element which extends from the one displacement guide to the other displacement guide. In particular, the connection device can have precisely one connection element which extends over all displacement guides.

The predefined distance preferably depends on the length of the connection element between the two displacement guides. As an alternative to this, the predefined distance can depend on the modulus of elasticity of the connection element.

In the case of a preferred embodiment, each of the two displacement guides has longitudinal sides which, in the state attached to the support shaft, extend along the longitudinal direction of the support shaft. The connection device is fixed to at least one longitudinal side of each of the two displacement guides, preferably in each case by means of the fixing element of the connection device.

It can be advantageous when the connection device comprises two connection elements,
wherein the one connection element extends from a longitudinal side of the one displacement guide to a longitudinal side of the other displacement guide and
wherein the other connection element extends from the other longitudinal side of the one displacement guide to the other longitudinal side of the other displacement guide.

Preferred embodiments of the connection device ae explained below. The various embodiments are able to be combined with one another.

In the case of a preferred embodiment, the connection element comprises or both connection elements comprise in each case a chain or a cable or the connection element is or the connection elements are in each case a chain or a cable. The chain or the cable is fixed to both displacement guides by means of a fixing element of the connection device. The length of the chain or of the cable between the fixing elements of the two displacement guides is greater than the distance between the fixing elements of the two displacement guides when the two displacement guides abut against one another.

In the case of said embodiment, the one displacement guide, in the state coupled with the other displacement guide, is displaceable as a result of exertion of a tensile force on the chain or the cable to the predefined distance from the other displacement guide along the longitudinal direction of the support shaft and then is displaceable as a result of exertion of a tensile force on the chain or the cable at the predefined distance to the adjacent displacement guide together with the other displacement guide along the longitudinal direction of the support shaft in the direction of the tensile force on account of the coupling by means of the chain or of the cable.

In the case of a further preferred embodiment, the connection element comprises or both connection elements comprise in each case an elastic belt or the connection element is or the connection elements are in each case an elastic belt.

In the case of said embodiment, the one displacement guide, in the state coupled with the other displacement guide, is displaceable as a result of exertion of a tensile force on the one displacement guide to the predefined distance from the other displacement guide along the longitudinal direction of the support shaft and then is displaceable as a result of exertion of a tensile force on the one displacement guide at the predefined distance to the other displacement guide together with the other displacement guide along the longitudinal direction of the support shaft in the direction of the tensile force on account of the coupling by means of the elastic belt.

In the case of a further preferred embodiment, the connection device has on each of the two displacement guides a bolt and a connection element which extends from the one displacement guide to the other displacement guide when the two displacement guides abut against one another. Each connection element comprises a recess. The recess of the connection element of the one displacement guide, in the state coupled with the other displacement guide, receives the bolt of the other displacement guide in such a manner that the bolt of the other displacement guide is displaceable in the recess of the connection element of the one displacement guide along the longitudinal direction of the support shaft by the predefined distance, wherein the recess of the connection element of the one displacement guide forms a stop for the bolt of the other displacement guide so that both displacement guides are displaceable together at the predefined distance with respect to one another along the longitudinal direction of the support shaft.

In the case of a further preferred embodiment, the connection device has a hollow cylinder on each of the two displacement guides and a piston arranged therein. The piston of the one displacement guide is movable relative to the hollow cylinder of the one displacement guide and is coupled with the hollow cylinder of the other displacement guide in such a manner that
the one displacement guide is slidable away from the other displacement guide along the longitudinal direction of the support shaft until a stop of the piston of the one displacement guide abuts against a delimiter of the hollow cylinder of the one displacement guide and both displacement guides are displaceable together at the predefined distance with respect to one another along the longitudinal direction of the support shaft, whilst the stop of the piston of the one displacement guide abuts against the delimiter of the hollow cylinder of the one displacement guide.

In the case of said embodiment, it is advantageous when each hollow cylinder extends over the entire length, running in the longitudinal direction of the support shaft, of one of the longitudinal sides of the associated displacement guide and that the extension of each piston is longer in the longitudinal direction of the support shaft than the predefined distance.

In the case of a further preferred embodiment, the connection device for the two displacement guides comprises two connection plates which are connected together in an articulated manner. The one connection plate is fixed rotatably to the one displacement guide and the other connection plate is fixed rotatably to the other displacement guide.

In the case of said embodiment, the one displacement guide, in the state coupled with the other displacement guide, is displaceable as a result of exertion of a tensile force on the one displacement guide to the predefined distance from the other displacement guide along the longitudinal direction of the support shaft and then is displaceable as a result of exertion of a tensile force on the one displacement guide at the predefined distance to the other displacement guide together with the other displacement guide along the longitudinal direction of the support shaft in the direction of the tensile force on account of the coupling by means of the connection device.

In the case of said embodiment, the predefined distance depends on the length or on the longest extension of the two connection plates.

In the case of all embodiments, it is preferred when the conveyor belt stripping device comprises an actuating device for displacing the displacement guides in the longitudinal direction of the support shaft. In a particularly preferred manner, the actuating device interacts with the connection device.

The displacement guides are preferably realized as a hollow profile or a T-profile foot which is open on one side.

The displacement guides can comprise an adapter for the attachment of a specific stripping segment, in particular a standard stripping segment.

The problem demonstrated previously is also solved by a displacement guide for the attachment of a stripping segment to a support shaft of a conveyor belt stripping device according to Claim 21. Preferred designs and further developments of the displacement guide according to the invention are the object of the relevant subclaims.

The displacement guide according to the invention is connectable to the stripping segment, is attachable to the support shaft in a positive locking manner so as to transmit torque and is displaceable in the longitudinal direction of the support shaft once a fastening device of the conveyor belt stripping device has been released. By means of a connection device, the displacement guide is operatively couplable in the longitudinal direction of the support shaft with a displacement guide which is arranged (directly) next to the displacement guide on the support shaft. The displacement guide, in the state coupled with the adjacent displacement guide, is displaceable to a predefined distance from the adjacent displacement guide along the longitudinal direction of the support shaft and then is displaceable at the predefined distance to the adjacent displacement guide together with the adjacent displacement guide along the longitudinal direction of the support shaft on account of the coupling by means of the connection device.

The displacement guide, in the state coupled with the adjacent displacement guide, is preferably displaceable by means of the connection device to the predefined distance from the adjacent displacement guide along the longitudinal direction of the support shaft and then is displaceable by means of the connection device at the predefined distance to the adjacent displacement guide together with the adjacent displacement guide along the longitudinal direction of the support shaft on account of the coupling by means of the connection device.

In a preferred manner, the displacement guide, in the state coupled with the adjacent displacement guide, is displaceable as a result of exertion of a tensile force on the displacement guide to the predefined distance from the adjacent displacement guide along the longitudinal direction of the support shaft and then is displaceable as a result of exertion of a tensile force on the displacement guide by means of the connection device at the predefined distance to the adjacent displacement guide together with the adjacent displacement guide along the longitudinal direction of the support shaft in the direction of the tensile force on account of the coupling by means of the connection device.

The connection device can be fixed to both displacement guides, in particular by means of a fixing element of the connection device.

The connection device can have a connection element which extends from the displacement guide to the adjacent displacement guide.

The predefined distance preferably depends on the length of the connection element between the displacement guide and the adjacent displacement guide. As an alternative to this, the predefined distance can depend on the modulus of elasticity of the connection element.

In a preferred manner, the displacement guide has longitudinal sides which, in the state attached to the support shaft, extend along the longitudinal direction of the support shaft. The connection device is fixed to at least one longitudinal side of the displacement guide, preferably by means of the fixing element of the connection device.

It can be advantageous when the connection device comprises two connection elements,
wherein the one connection element extends from a longitudinal side of the displacement guide to a longitudinal side of the adjacent displacement guide.

In the case of a preferred embodiment, the connection element comprises a chain or a cable or the connection element is a chain or a cable.

In the case of a further preferred embodiment, the connection element comprises an elastic belt or the connection element is an elastic belt.

In the case of a further preferred embodiment, the connection device has on the displacement guide a bolt and a connection element which extends from the displacement guide to the adjacent displacement guide when the displacement guide abuts against the adjacent displacement guide. The connection element comprises a recess. In the state coupled with the adjacent displacement guide, the recess of the connection element of the displacement guide receives the bolt of the adjacent displacement guide in such a manner that the bolt of the adjacent displacement guide is displaceable in the recess of the connection element of the displacement guide along the longitudinal direction of the support shaft by the predefined distance, wherein the recess of the connection element of the displacement guide forms a stop for the bolt of the adjacent displacement guide so that the displacement guide is displaceable together with the adjacent displacement guide at the predefined distance with respect to one another along the longitudinal direction of the support shaft.

In the case of a further preferred embodiment, the connection device has a hollow cylinder on the displacement guide and a piston arranged therein. The piston is movable relative to the hollow cylinder and is couplable with the hollow cylinder of the adjacent displacement guide in such a manner that the displacement guide is slidable away from the adjacent displacement guide along the longitudinal direction of the support shaft until a stop of the piston of the displacement guide abuts against a delimiter of the hollow cylinder of the displacement guide and the displacement guide is displaceable together with the adjacent displacement guide at the predefined distance with respect to one another along the longitudinal direction of the support shaft, whilst the stop of the piston of the displacement guide abuts against the delimiter of the hollow cylinder of the displacement guide.

In the case of said embodiment, it is advantageous that the hollow cylinder extends over the entire length, running in the longitudinal direction of the support shaft, of one of the longitudinal sides of the displacement guide and that the extension of the piston is longer in the longitudinal direction of the support shaft than the predefined distance.

In the case of a further preferred embodiment, the connection device for the displacement guide has two connection plates which are connected together in an articulated manner.

The one connection plate is fixed rotatably to the displacement guide and the other connection plate is fixed rotatably to the adjacent displacement guide.

In the case of said embodiment, the predefined distance depends on the length or on the longest extension of the two connection plates.

The displacement guide is preferably realized as a hollow profile or a T-profile foot which is open on one side.

The displacement guide can comprise an adapter for the attachment of a specific stripping segment, in particular of a standard stripping segment.

Figure 2:
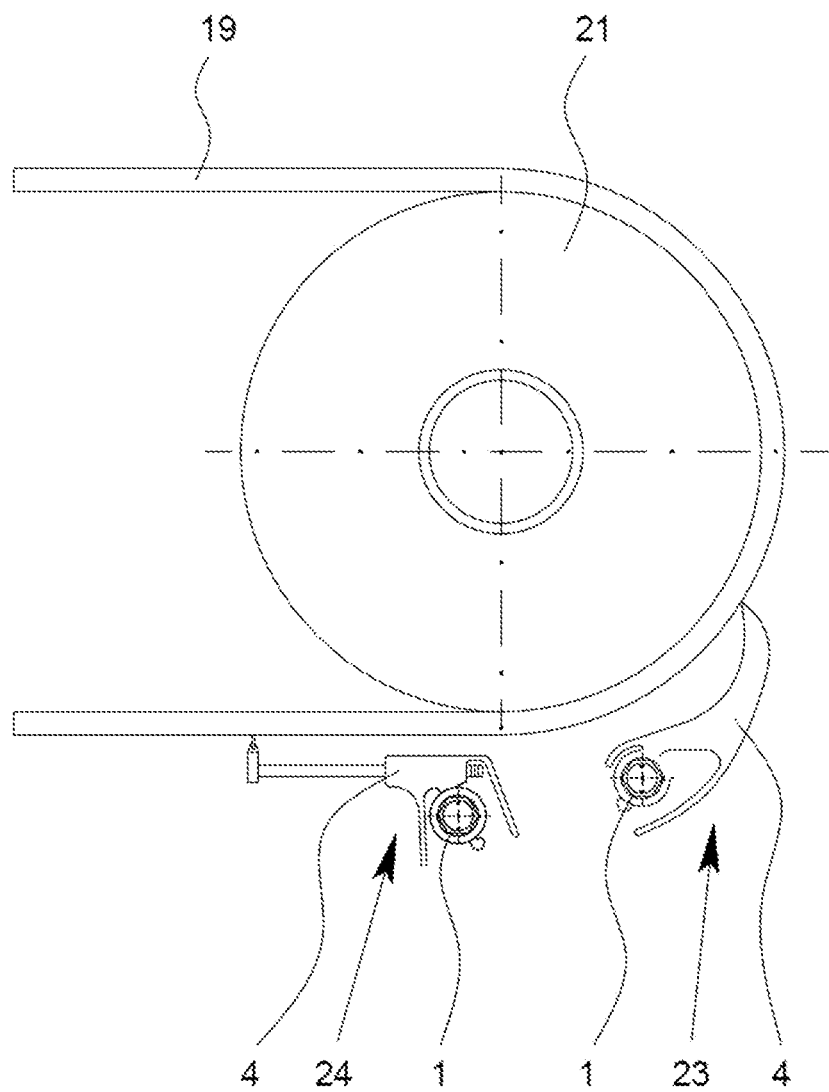
Figure 11:
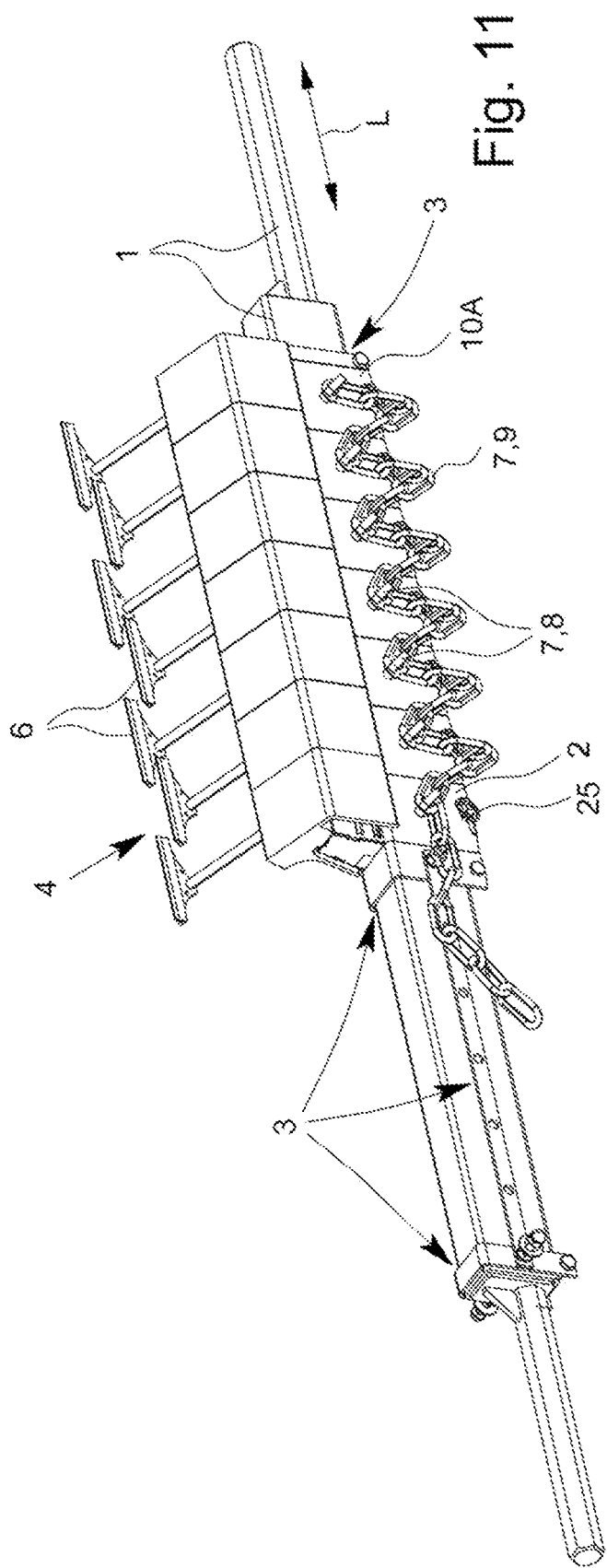
Figure 28:
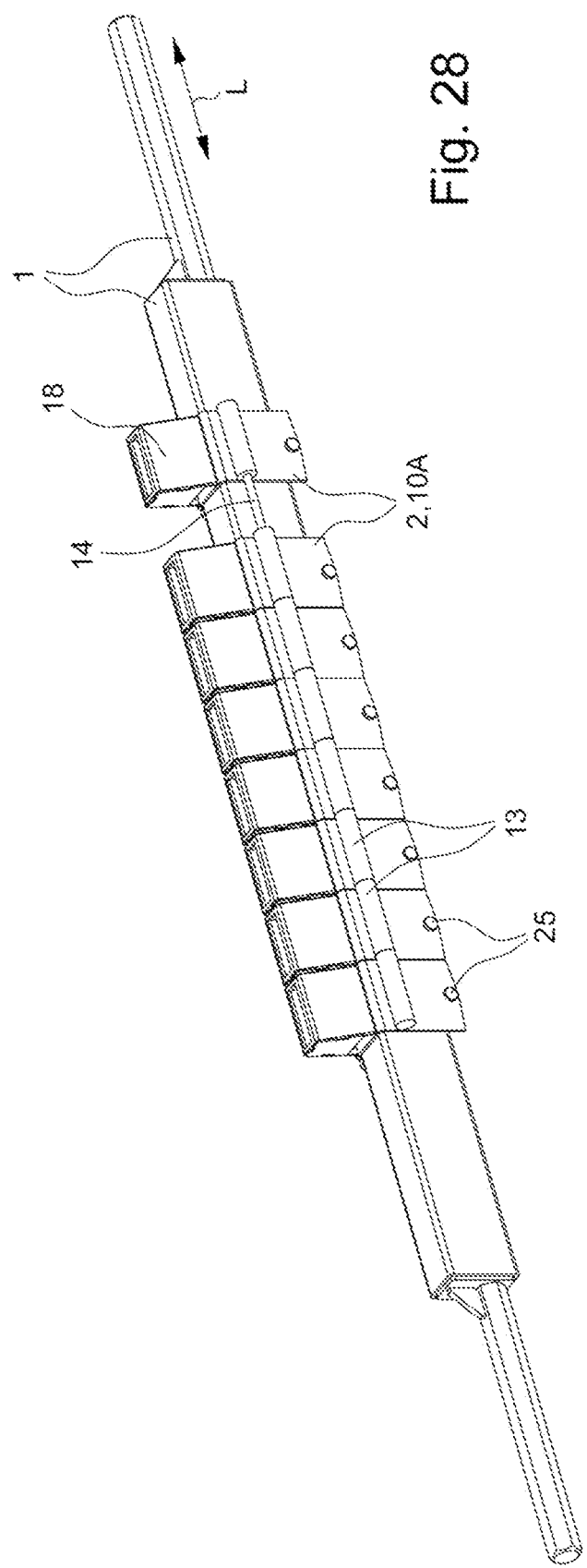
Figure 29:
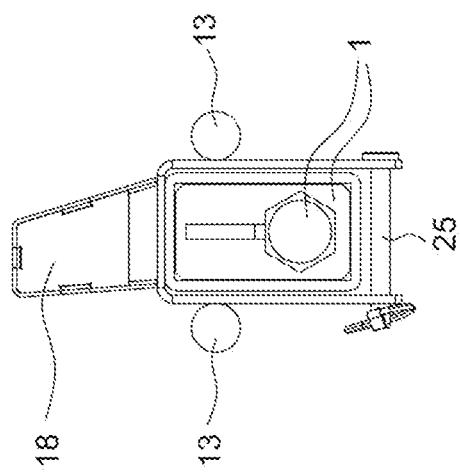

The invention is now described in more detail below by way of a drawing which just shows preferred exemplary embodiments, in which FIG. 1 shows a schematically simplified representation of a prior art in order to explain the basic principle of a conveyor belt stripping device for a conveyor belt of a conveyor system, FIG. 2 shows a side view of a typical conveyor belt stripping device on a conveyor belt, once again from the prior art, FIG. 3 shows a schematic representation of a perspective view of the parts, seen here as essential, of a first exemplary embodiment of a conveyor belt stripping device according to the invention for a conveyor belt of a conveyor system, FIG. 4 shows a schematic representation of a side view of the conveyor belt stripping device from FIG. 3, FIG. 5 shows a schematic representation of a front view of the conveyor belt stripping device from FIG. 3, FIG. 6 shows a schematic representation of a top view of the conveyor belt stripping device from FIG. 3, FIG. 7 shows a schematic representation of a perspective view of the parts, seen here as essential, of a second exemplary embodiment of a conveyor belt stripping device according to the invention for a conveyor belt of a conveyor system, FIG. 8 shows a schematic representation of a side view of the conveyor belt stripping device from FIG. 7, FIG. 9 shows a schematic representation of a front view of the conveyor belt stripping device from FIG. 7, FIG. 10 shows a schematic representation of a top view of the conveyor belt stripping device from FIG. 7, FIG. 11 shows a schematic representation of a perspective view of the parts, seen here as essential, of a third exemplary embodiment of a conveyor belt stripping device according to the invention for a conveyor belt of a conveyor system, FIG. 12 shows a schematic representation of a perspective view of the parts, seen here as essential, of a fourth exemplary embodiment of a conveyor belt stripping device according to the invention for a conveyor belt of a conveyor system, FIG. 13 shows a schematic representation of a side view of the conveyor belt stripping device from FIG. 12, FIG. 14 shows a schematic representation of a front view of the conveyor belt stripping device from FIG. 12, FIG. 15 shows a schematic representation of a top view of the conveyor belt stripping device from FIG. 12, FIG. 16 shows a schematic representation of a perspective view of the parts, seen here as essential, of a fifth exemplary embodiment of a conveyor belt stripping device according to the invention for a conveyor belt of a conveyor system, FIG. 17 shows a schematic representation of a side view of the conveyor belt stripping device from FIG. 16, FIG. 18 shows a schematic representation of a front view of the conveyor belt stripping device from FIG. 16, FIG. 19 shows a schematic representation of a top view of the conveyor belt stripping device from FIG. 16, FIG. 20 shows a schematic representation of a perspective view of the parts, seen here as essential, of a sixth exemplary embodiment of a conveyor belt stripping device according to the invention for a conveyor belt of a conveyor system, FIG. 21 shows a schematic representation of a side view of the conveyor belt stripping device from FIG. 20, FIG. 22 shows a schematic representation of a front view of the conveyor belt stripping device from FIG. 20, FIG. 23 shows a schematic representation of a top view of the conveyor belt stripping device from FIG. 20, FIG. 24 shows a schematic representation of a perspective view of the parts, seen here as essential, of a seventh exemplary embodiment of a conveyor belt stripping device according to the invention for a conveyor belt of a conveyor system, FIG. 25 shows a schematic representation of a side view of the conveyor belt stripping device from FIG. 24, FIG. 26 shows a schematic representation of a front view of the conveyor belt stripping device from FIG. 24, FIG. 27 shows a schematic representation of a top view of the conveyor belt stripping device from FIG. 24, FIG. 28 shows a schematic representation of a perspective view of the parts, seen here as essential, of an eighth exemplary embodiment of a conveyor belt stripping device according to the invention for a conveyor belt of a conveyor system, FIG. 29 shows a schematic representation of a side view of the conveyor belt stripping device from FIG. 28, FIG. 30 shows a schematic representation of a front view of the conveyor belt stripping device from FIG. 28, FIG. 31 shows a schematic representation of a top view of the conveyor belt stripping device from FIG. 28, FIG. 32 shows a schematic representation of a longitudinal section through part of the conveyor belt stripping device from FIG. 28, FIG. 33 shows a schematic representation of a perspective view of the parts, seen here as essential, of a ninth exemplary embodiment of a conveyor belt stripping device according to the invention for a conveyor belt of a conveyor system, FIG. 34 shows a schematic representation of a side view of the conveyor belt stripping device from FIG. 33, FIG. 35 shows a schematic representation of a front view of the conveyor belt stripping device from FIG. 33, FIG. 36 shows a schematic representation of a top view of the conveyor belt stripping device from FIG. 33.

FIG. 1 shows a schematic view of a detail of a conveyor belt 19 of a conveyor system, on which bulk material 20 is situated. Said conveyor belt 19 runs from back left to front right in FIG. 1. It is turned around at a deflection roller 21 so that its lower belt portion runs back from front right to back left, that is to say in the direction of the starting point.

A conveyor belt stripping device with a support shaft 1 can be seen below the conveyor belt 19 and not far from the deflection roller 21.

A holder 22 for the support shaft 1 can be seen in each case on the left and the right in FIG. 1 with the support shaft 1 only shown by broken lines. The support shaft 1 is rotatably mounted here in the holders 22. A tensioning device which applies a suitable prestressing force on the support shaft 1 is not shown in FIG. 1. The prior art is referred to in this respect.

Three stripping segments 4 are shown on the support shaft 1 in FIG. 1 as an example. Each stripping segment 4 has a stripping end 6 which comes to abut against the conveyor belt 19 and a holding end 5 which is connected in a positive locking manner to the support shaft 1 so as to transmit torque and is at spacing from the stripping end 6.

In the example of the prior art shown here, each stripping segment 4 has a body of polyurethane in which the stripping end 6, in the form of a support rod with a stripping lip at the end, is mounted. The body of the stripping segment 4 continues in the holding end 5, which is inserted into a corresponding receiving means in the support shaft 1. This is only one of various possibilities in the prior art for attaching a stripping segment 4 to the support shaft 1 of the conveyor belt stripping device.

FIG. 2 shows a schematic representation of a further prior art, namely a side view of a typical conveyor belt stripping device on a conveyor belt 19. It is possible to see a typical primary stripper 23 on the deflection roller 3 on the right in FIG. 2 and a typical secondary stripper 24 which cooperates from below with the lower returning portion of the conveyor belt 19 on the left in FIG. 2. Reference is also made to the prior art in this respect.

FIG. 3 shows a schematic representation of a perspective view of the parts, seen here as essential, of a first exemplary embodiment of a conveyor belt stripping device according to the invention for a conveyor belt of a conveyor system. FIGS. 4 to 6 show further views of said conveyor belt stripping device. The conveyor belt stripping device has a support shaft 1 and eight displacement guides 2 which are arranged side by side on the support shaft 1 in a positive locking manner so as to transmit torque.

Each of the displacement guides 2 is displaceable in the longitudinal direction L of the support shaft 1 once a fastening device, not shown here, has been released and is connected to a holding end 5 of a stripping segment 4. As an alternative to this, the displacement guides 2 can be realized integrally with the holding end 5. The stripping segment 4 must then be a stripping segment 4 which is specially adapted to the present application.

Each stripping segment 4 comprises a stripping end 6 which is at a spacing from the holding end 5 and is movable into abutment with the conveyor belt.

These are stripping segments 4 of a primary stripper 23 in this case. As an alternative to this, they can be stripping segments 4 of a secondary stripper 24 (see FIGS. 7 to 11).

The displacement guides 2 are operatively couplable and here are also coupled together in the longitudinal direction L of the support shaft 1 by means of a connection device 7.

In the case of the preferred exemplary embodiment shown here, the connection device 7 has precisely one connection element 9 which extends over all displacement guides 2 and beyond. The connection element 9 here is a chain.

The chain preferably comprises metal or consists of metal. In a preferred manner, it is a round link chain.

Each of the displacement guides 2 has longitudinal sides 10A, 10B which, in the state attached to the support shaft 1, extend along the longitudinal direction L of the support shaft 1. The connection device 7 is fixed to a longitudinal side 10A of each displacement guide 2 in each case by means of a fixing element 8. The length of the chain 9 or of the portion of the chain 9 between the fixing elements 8 of two displacement guides 2 arranged directly side by side (that is to say adjacent) is greater than the distance between the fixing elements 8 of said two displacement guides 2 when said two displacement guides 2 abut against one another. The respective predefined distance depends on the length of the chain 9 or of the portion of the chain 9 between in each case two adjacent displacement guides 2.

In the case of the preferred exemplary embodiment shown in FIG. 3, the first displacement guide 2 proceeding from the left, in the state coupled with the second displacement guide 2 proceeding from the left (the displacement guide 2 arranged at a certain distance to the right next to the first displacement guide 2 in FIG. 3), is displaceable as a result of exertion of a tensile force on the chain 9 to the predefined distance from the second displacement guide 2 along the longitudinal direction L of the support shaft 1. The exertion of the tensile force on the chain 9 is effected here to the left along the longitudinal direction L of the support shaft 1. The second displacement guide 2, in the state coupled with the third displacement guide 2 proceeding from the left (the displacement guide 2 abutting against the second displacement guide 2 on the right in FIG. 3) is once again displaceable as a result of exertion of a tensile force on the chain 9 to the predefined distance from the third displacement guide 2 along the longitudinal direction L of the support shaft 1. The same applies to the further displacement guides 2—up to the eighth displacement guide 2 (outside right).

The first displacement guide 2 is therefore spatially removable from the second displacement guide 2 coupled with it and from the other displacement guides 2 whilst the first displacement guide 2 is arranged on the support shaft 1. This can occur such that the second displacement guide 2 and/or the further displacement guides 2 are not displaced at the same time.

As a result of corresponding repetition, displacement guides 2 which abut against one another can be separated into singles in this manner.

It can be seen in FIG. 3 that the first displacement guide 2 is arranged on the support shaft 1 at a certain distance from the second displacement guide 2. Said certain distance is smaller than the predefined distance.

If the first and the second displacement guides 2 have been separated out into singles, the first displacement guide 2 is displaceable at the predefined distance to the second displacement guide 2 as a result of exertion of a tensile force on the chain 9 (to the left in FIG. 3) together with the second displacement guide along the longitudinal direction L of the support shaft 1 in the direction of the tensile force on account of the coupling by means of the chain 9.

An embodiment where the connection device comprises a further chain as second connection element is not shown, the further chain being fixed to the longitudinal side 10B of each displacement guide 2 in each case by means of a fixing element 8.

FIG. 7 shows a schematic representation of a perspective view of the parts, seen here as essential, of a second exemplary embodiment of a conveyor belt stripping device according to the invention for a conveyor belt of a conveyor system. FIGS. 8 to 10 show further views of said conveyor belt stripping device. Said conveyor belt stripping device is realized as the conveyor belt stripping device according to the first exemplary embodiment—with the difference that differently designed stripping segments 4 are provided which are part of a secondary stripper 24.

FIG. 11 shows a schematic representation of a perspective view of the parts, seen here as essential, of a third exemplary embodiment of a conveyor belt stripping device according to the invention for a conveyor belt of a conveyor system. Compared to the conveyor belt stripping device according to the second exemplary embodiment, FIG. 11 only shows seven instead of eight displacement guides 2. In addition, a fastening device 3 is illustrated here as an example for all exemplary embodiments.

The fastening device 3 forms for the displacement guides 2 a left-hand stop which is situated on the support shaft 1 and a right-hand stop which is situated on the support shaft 1. The right-hand stop in FIG. 11 is arranged and fixed during the mounting of the conveyor belt stripping device on the support shaft 1 so that the position thereof is no longer modifiable. The left-hand stop in FIG. 11 is arranged in a releasable manner on the support shaft 1. In the state fastened to the support shaft 1, the fastening device 3 blocks displacement of the displacement guides 2 in the longitudinal direction L of the support shaft 1. Once the fastening device 3 has been released, the left-hand stop is removable so that the displacement guides 2 are displaceable 2 in the longitudinal direction L of the support shaft 1.

FIG. 12 shows a schematic representation of a perspective view of the parts, seen here as essential, of a fourth exemplary embodiment of a conveyor belt stripping device according to the invention for a conveyor belt of a conveyor system. FIGS. 13 to 15 show further views of said conveyor belt stripping device. Said conveyor belt stripping device is realized basically as the conveyor belt stripping device according to the first exemplary embodiment. For reasons of simplification, no stripping segments 4 are shown in the case of the fourth exemplary embodiment.

Adapter 18 for the attachment of the holding end 6 of a specific stripping segment 4 is shown. With the adapter 18 designed in a corresponding manner, it is also possible to attach a standard stripping segment 4 here as is disclosed in the prior art.

In the case of the preferred exemplary embodiment shown here, the precisely one connection element 9 of the connection device 7 is a cable. The cable 9 is fixed to a longitudinal side 10A of each displacement guide 2 in each case by means of a fixing element 8. Each fixing element is realized in a sleeve-shaped manner.

The statements concerning the chain of the first exemplary embodiment apply correspondingly to the cable of the fourth exemplary embodiment.

FIG. 16 shows a schematic representation of a perspective view of the parts, seen here as essential, of a fifth exemplary embodiment of a conveyor belt stripping device according to the invention for a conveyor belt of a conveyor system. FIGS. 17 to 19 show further views of said conveyor belt stripping device. Said conveyor belt stripping device is realized basically as the conveyor belt stripping device according to the fifth exemplary embodiment. In the case of the preferred exemplary embodiment shown here, the connection element 9 of the connection device 7 is once again a cable which is fixed to a longitudinal side 10A of each displacement guide 2 in each case by means of a fixing element 8. Each fixing element is a locking bolt.

FIG. 20 shows a schematic representation of a perspective view of the parts, seen here as essential, of a sixth exemplary embodiment of a conveyor belt stripping device according to the invention for a conveyor belt of a conveyor system. FIGS. 21 to 23 show further views of said conveyor belt stripping device. Said conveyor belt stripping device is realized basically as the conveyor belt stripping device according to the fourth exemplary embodiment.

In the case of the preferred exemplary embodiment shown here, the connection device 7 has multiple connection elements 9. Each connection element 9 extends from a longitudinal side 10A of a displacement guide 2 to a longitudinal side 10A of an adjacent displacement guide 2 or from the other longitudinal side 10B of a displacement guide 2 to the other longitudinal side 10B of an adjacent displacement guide 2. A total of 14 connection elements 9 are consequently provided here.

Each connection element 9 is fixed to a longitudinal side 10A of a displacement guide 2 and to a longitudinal side 10A of an adjacent displacement guide 2 in each case by means of a fixing element 8 or to the other longitudinal side 10B of a displacement guide 2 and to the other longitudinal side 10B of an adjacent displacement guide 2 in each case by means of a fixing element 8.

The connection elements 9 are in each case an elastic belt.

In the case of the preferred exemplary embodiment shown in FIG. 20, the first displacement guide 2 proceeding from the right, in the state coupled with the second displacement guide 2 proceeding from the right (the displacement guide 2 arranged at a certain distance to the left next to the first displacement guide 2 in FIG. 20), is displaceable as a result of exertion of a tensile force on the first displacement guide 2 to the predefined distance from the second displacement guide 2 along the longitudinal direction L of the support shaft 1. The exertion of the tensile force on the displacement guide 2 is effected here to the right along the longitudinal direction L of the support shaft 1.

The second displacement guide 2, in the state coupled with the third displacement guide 2 proceeding from the right (the displacement guide 2 abutting against the second displacement guide 2 on the left in FIG. 20) is once again displaceable as a result of exertion of a tensile force on the displacement guide 2 to the predefined distance from the third displacement guide 2 along the longitudinal direction L of the support shaft 1. The same applies to the further displacement guides 2—up to the eighth displacement guide 2 (outside left).

The respective predefined distance depends on the modulus of elasticity of the respective elastic belt 9.

The elastic belts 9 preferably comprise a modulus of elasticity of approximately 15 MPa (according to ISO 527) and/or a tensile strength of approximately 45 MPa (according to ISO 527).

If the first and the second displacement guides 2 have been separated out into singles, the first displacement guide 2 is displaceable at the predefined distance to the second displacement guide 2 as a result of exertion of a tensile force on the displacement guide 2 (to the right in in FIG. 20) together with the second displacement guide along the longitudinal direction L of the support shaft 1 in the direction of the tensile force on account of the coupling by means of the elastic belt 9.

FIG. 24 shows a schematic representation of a perspective view of the parts, seen here as essential, of a seventh exemplary embodiment of a conveyor belt stripping device according to the invention for a conveyor belt of a conveyor system. FIGS. 25 to 27 show further views of said conveyor belt stripping device. Said conveyor belt stripping device is realized basically as the conveyor belt stripping device according to the fourth exemplary embodiment.

In the case of the preferred exemplary embodiment shown here, the connection device 7 has on each displacement guide 2 two bolts 11 and two connection elements 9. A connection element 9 and a bolt 11 are attached to the longitudinal side 10A of the respective displacement guide 2. A further connection element 9 and a further bolt 11 are attached to the other longitudinal side 10B of the respective displacement guide 2.

Each connection element 9 comprises a recess 12.

The seventh exemplary embodiment is explained below by way of the design on the one longitudinal side 10A of the displacement guides 2. The same applies to the design on the other longitudinal sides 10B of the displacement guides 2.

With two displacement guides 2 in the coupled state, the two connection elements 9 of the one displacement guide 2 extend from the one longitudinal side 10A of the one displacement guide 2 to the other displacement guide 2. The recess 12 of the connection element 9 on the longitudinal side 10A of the one displacement guide 2, in the coupled state, receives the bolt 11 on the longitudinal side 10A of the other displacement guide 2 in such a manner that the bolt 11 on the longitudinal side 10A of the other displacement guide 2 is displaceable in the recess 12 of the connection element 9 on the longitudinal side 10A of the one displacement guide 2 along the longitudinal direction L of the support shaft 1 by the defined distance so that the one displacement guide 2 is displaceable as a result of exertion of a tensile force on the one displacement guide 2 to the predefined distance from the other displacement guide 2 along the longitudinal direction L of the support shaft 1.

The recess 12 of the connection element 9 on the longitudinal side 10A of the one displacement guide 2 forms a stop for the bolt 11 on the longitudinal side 10A of the other displacement guide 2. If the bolt 11 of the other displacement guide 2 strikes against the recess 12 of the one displaceable guide 2, part of a tensile force exerted on the one displaceable guide 2 is transmitted to the other displacement guide 2. The other displacement guide 2 can thus be displaced to the predefined distance from a further displacement guide 2 coupled with the other displacement guide 2 along the longitudinal direction L of the support shaft 1. The displacement guides 2 can be separated out into singles in this way.

If the two coupled displacement guides 2 looked at at the start have been separated into singles, they can be displaced together to the predefined distance with respect to one another along the longitudinal direction L of the support shaft 1, as a result of exertion of a tensile force on the one displacement guide 2.

FIG. 28 shows a schematic representation of a perspective view of the parts, seen here as essential, of an eighth exemplary embodiment of a conveyor belt stripping device according to the invention for a conveyor belt of a conveyor system. FIGS. 29 to 32 show further views of said conveyor belt stripping device. Said conveyor belt stripping device is realized basically as the conveyor belt stripping device according to the fourth exemplary embodiment.

In the case of the preferred exemplary embodiment shown here, the connection device 7 has two hollow cylinders 13 on each displacement guide 2. The one hollow cylinder 13 is attached to the one longitudinal side 10A of the respective displacement guide 2. The other hollow cylinder 13 is attached to the other longitudinal side 10B of the respective displacement guide 2. A piston 14 is arranged in each of the two hollow cylinders 13.

Each hollow cylinder 13 has a delimiter 16 and each piston 14 has a stop 15. In the case of the preferred exemplary embodiment shown here, the delimiter 16 is formed by a narrowing of the hollow cylinder 13 at one of its ends and the stop 15 is formed by a widening of the piston 14 at one of its ends.

The eighth exemplary embodiment is explained below by way of the design on the one longitudinal side 10A of the displacement guides 2. The same applies to the design on the other longitudinal sides 10B of the displacement guides 2.

With two displacement guides 2 in the coupled state, the piston 14 on the one longitudinal side 10A of the one displacement guide 2 is movable relative to the hollow cylinder 14 on the one longitudinal side 10A of the one displacement guide 2 and is coupled with the hollow cylinder 13 on the one longitudinal side 10A of the other displacement guide 2 in such a manner that the other displacement guide 2 is slidable away from the one displacement guide 2 along the longitudinal direction L of the support shaft 1 as a result of exertion of a tensile force on the other displacement guide 2 until the stop 15 of the piston 14 on the one longitudinal side 10A of the one displacement guide 2 abuts against the delimiter 16 of the hollow cylinder 13 on the one longitudinal side 10A of the one displacement guide 2 so that the other displacement guide 2 is displaceable to the predefined distance from the one displacement guide 2 along the longitudinal direction L of the support shaft 1 as a result of exertion of a tensile force on the other displacement guide 2.

The piston 14 on the one longitudinal side 10A of the one displacement guide 2 can be releasably connected for coupling, for example, with the hollow cylinder 13 on the one longitudinal side 10A of the other displacement guide 2. In a particularly preferred manner, there is a plug-in connection here. To this end, the piston 14 on the one longitudinal side 10A of the one displacement guide 2 can project into the hollow cylinder 13 on the one longitudinal side 10A of the other displacement guide 2 and can be locked by a pluggable locking element such as a spring split pin.

If the stop 15 of the piston 14 on the one longitudinal side 10A of the one displacement guide 2 abuts against the delimiter 16 of the hollow cylinder 13 on the one longitudinal side 10A of the one displacement guide 2, part of a tensile force exerted on the other displacement guide 2 is thus transmitted to the one displacement guide 2. The one displacement guide 2 can thus be displaced to the predefined distance from a further displacement guide 2 coupled with the one displacement guide 2 along the longitudinal direction L of the support shaft 1. The displacement guides 2 can be separated into singles in this way.

If the two coupled displacement guides 2 looked at at the start have been separated into singles, they can be displaced together at the predefined distance with respect to one another along the longitudinal direction L of the support shaft 1, whilst the stop 15 of the piston 14 on the one longitudinal side 10A of the one displacement guide 2 abuts against the delimiter 16 of the hollow cylinder 13 on the one longitudinal side 10A of the one displacement guide 2, as a result of exertion of a tensile force on the other displacement guide 2.

In the case of the preferred exemplary embodiment shown here, each hollow cylinder 13 extends over the entire length, running in the longitudinal direction of the support shaft 1, of the one longitudinal side 10A of the associated displacement guide 2. The extension of each piston 14 in the longitudinal direction of the support shaft 1 is longer than the predefined distance.

FIG. 33 shows a schematic representation of a perspective view of the parts, seen here as essential, of a ninth exemplary embodiment of a conveyor belt stripping device according to the invention for a conveyor belt of a conveyor system. FIGS. 34 to 36 show further views of said conveyor belt stripping device. Said conveyor belt stripping device is realized basically as the conveyor belt stripping device according to the fourth exemplary embodiment.

In the case of the preferred exemplary embodiment shown here, the connection device 7 has two connection plates 17A, 17B, which are connected together in an articulated manner, for the coupling of in each case two adjacent displacement guides 2. The one connection plate 17A is fixed to a longitudinal side 10A of the one displacement guide 2 so as to be rotatable by means of a fixing element 8 and the other connection plate 17B is fixed to a longitudinal side 10A of the other displacement guide 2 so as to be rotatable by means of a further fixing element 8.

The maximum extension of two connection plates 17A, 17B connected together is greater than the predefined distance (which is dependent on said maximum extension) and greater than the distance between the fixing elements 8 of said two displacement guides 2 when said two displacement guides 2 abut against one another.

In the case of the preferred exemplary embodiment shown in FIG. 33, the first displacement guide 2 proceeding from the right, in the state coupled with the second displacement guide 2 proceeding from the right (the displacement guide 2 arranged at a certain distance to the left next to the first displacement guide 2 in FIG. 33), is displaceable to the predefined distance from the second displacement guide 2 along the longitudinal direction L of the support shaft 1 as a result of exertion of a tensile force on the first displacement guide 2. The exertion of the tensile force on the displacement guide 2 is effected here to the right along the longitudinal direction L of the support shaft 1. The second displacement guide 2, in the state coupled with the third displacement guide 2 proceeding from the right (the displacement guide 2 abutting against the second displacement guide 2 on the left in FIG. 33) is once again displaceable to the predefined distance from the third displacement guide 2 along the longitudinal direction L of the support shaft 1 as a result of exertion of a tensile force on the second displacement guide 2. The same applies to the further displacement guides 2—up to the eighth displacement guide 2 (outside left).

The first displacement guide 2 is therefore spatially removable from the second displacement guide 2 coupled with it and from the other displacement guides 2 whilst the first displacement guide 2 is arranged on the support shaft 1. This can occur such that the second displacement guide 2 and/or the further displacement guides 2 are not displaced at the same time.

As a result of corresponding repetition, displacement guides 2 which abut against one another can be separated into singles in this manner.

It can be seen in FIG. 33 that the first displacement guide 2 is arranged on the support shaft 1 at a certain distance from the second displacement guide 2. Said certain distance is smaller than the predefined distance. The connection plate 17A which is attached to the first displacement guide 2 and the connection plate 17B which is connected to said connection plate 17A and is attached to the second displacement guide 2 have not reached their common maximum extension in FIG. 33.

If the first and the second displacement guides 2 have been separated out into singles, the first displacement guide 2 is displaceable at the predefined distance to the second displacement guide 2 as a result of exertion of a tensile force on the second displacement guide (to the right in in FIG. 33) together with the second displacement guide along the longitudinal direction L of the support shaft 1 in the direction of the tensile force on account of the coupling by means of the connection plates 17A, 17B.

An embodiment where, for coupling in each case two adjacent displacement guides 2, the connection device has two further connection plates which are connected together in an articulated manner, wherein the one connection plate is fixed to the other longitudinal side 10B of the one displacement guide 2 so as to be rotatable and the other connection plate is fixed to the other longitudinal side 10B of the other displacement guide 2 so as to be rotatable, is not shown.

The displacement guides 2 are realized as hollow profiles which are open on one side in FIGS. 3 to 36.

FIGS. 3 to 36 show, apart from this, the displacement guides 2 with a fastening means 25, in particular a locking bolt, by means of which the respective displacement guide 2 with the stripping segment 4 attached thereto is locked securely (but so as to be displaceable in the longitudinal direction L of the support shaft 1) on the support shaft 1.

As can be seen from the preceding realizations, an object of the invention is also a displacement guide 2 per se, for the attachment of a stripping segment 4 to a support shaft 1 of a conveyor belt stripping device. The displacement guide 2 according to the invention, in this case, is realized as one of the above-described displacement guides 2 of the conveyor belt stripping devices according to one of the above exemplary embodiments. Reference may be made to the preceding statements in this context.

LIST OF REFERENCES

1 Support shaft
2 Displacement guide
3 Fastening device
4 Stripping segment
5 Holding end of 4
6 Stripping end of 4
7 Connection device
8 Fixing element of 7
9 Connection element of 7
10A, 10B Longitudinal side of 2
11 Bolt of 7
12 Recess of 9
13 Hollow cylinder of 7

14 Piston of 7
15 Stop of 14
16 Delimiter of 13
17A, 17B Connection plate of 7
18 Adapter
19 Conveyor belt
20 Bulk material
21 Deflection roller
22 Holder for 1
23 Primary stripper
24 Secondary stripper
25 Fastening means of 2
L Longitudinal direction of 1

The invention claimed is:

1. A conveyor belt stripping device for a conveyor belt of a conveyor system,
  having a support shaft and at least two displacement guides which are arranged side by side on the support shaft in a positive locking manner so as to transmit torque, wherein each of the two displacement guides
    is displaceable in a longitudinal direction of the support shaft once a fastening device has been released and
    is connected to a holding end of a stripping segment, wherein the stripping segment comprises a stripping end which is spaced from the holding end and is movable to abut the conveyor belt,
  wherein
    the two displacement guides are operatively couplable together in the longitudinal direction of the support shaft by means of a connection device,
  one of the two displacement guides, in the state coupled with the other displacement guide, is displaceable along the longitudinal direction of the support shaft to a predefined distance from the other displacement guide and then is displaceable along the longitudinal direction of the support shaft at the predefined distance to the other displacement guide together with the other displacement guide on account of the coupling by means of the connection device.

2. The conveyor belt stripping device according to claim 1, wherein one of the two displacement guides, in the state coupled with the other displacement guide, is displaceable by means of the connection device along the longitudinal direction of the support shaft to the predefined distance from the other displacement guide and then is displaceable by means of the connection device along the longitudinal direction of the support shaft at the predefined distance to the other displacement guide together with the other displacement guide on account of the coupling by means of the connection device.

3. The conveyor belt stripping device according to claim 1, wherein one of the two displacement guides, in the state coupled with the other displacement guide, is displaceable by exertion of a tensile force on the one displacement guide along the longitudinal direction of the support shaft to the predefined distance from the other displacement guide and then is displaceable by exertion of a tensile force on the one displacement guide by means of the connection device along the longitudinal direction of the support shaft at the predefined distance to the other displacement guide together with the other displacement guide in the direction of the tensile force on account of the coupling by means of the connection device.

4. The conveyor belt stripping device according to claim 1, wherein the connection device is fixed to both displacement guides, preferably by means of a fixing element of the connection device.

5. The conveyor belt stripping device according to claim 1, wherein the connection device has a connection element which extends from the one displacement guide to the other displacement guide.

6. The conveyor belt stripping device according to claim 5, wherein the predefined distance depends on the length of the connection element between the two displacement guides.

7. The conveyor belt stripping device according to claim 5, wherein the predefined distance depends on the modulus of elasticity of the connection element.

8. The conveyor belt stripping device according to claim 5, wherein the connection element or both connection elements is/are in each case an elastic belt.

9. The conveyor belt stripping device according to claim 1, wherein the connection device has precisely one connection element which extends over all displacement guides.

10. The conveyor belt stripping device according to claim 1, wherein each of the two displacement guides comprises longitudinal sides which, in the state attached to the support shaft, extend along the longitudinal direction of the support shaft and in that the connection device is fixed to at least one longitudinal side of each of the two displacement guides.

11. The conveyor belt stripping device according to claim 1, wherein the connection device comprises two connection elements,
  in that the one connection element extends from a longitudinal side of the one displacement guide to a longitudinal side of the other displacement guide and
  in that the other connection element extends from the other longitudinal side of the one displacement guide to the other longitudinal side of the other displacement guide.

12. The conveyor belt stripping device according to claim 11, wherein the connection element or both connection elements is/are in each case a chain or a cable and the length of the chain or of the cable between the fixing elements of the two displacement guides is greater than the distance between the fixing elements of the two displacement guides when the two displacement guides abut against one another.

13. The conveyor belt stripping device according to claim 1, wherein the connection device has on each of the two displacement guides a bolt and a connection element which extends from the one displacement guide to the other displacement guide when the two displacement guides abut against one another,
  in that each connection element comprises a recess,
  in that the recess of the connection element of the one displacement guide, in the state coupled with the other displacement guide,
  receives the bolt of the other displacement guide in such a manner that the bolt of the other displacement guide is displaceable in the recess of the connection element of the one displacement guide along the longitudinal direction of the support shaft by the predefined distance and
  forms a stop for the bolt of the other displacement guide so that both displacement guides are displaceable together at the predefined distance with respect to one another along the longitudinal direction of the support shaft.

14. The conveyor belt stripping device according to claim 1, wherein the connection device has a hollow cylinder on each of the two displacement guides and a piston arranged therein, in that the piston of the one displacement guide is movable relative to the hollow cylinder of the one displacement guide, the piston of the one displacement guide is coupled with the hollow cylinder of the other displacement guide in such a manner that the one displacement guide is slidable away from the other displacement guide along the longitudinal direction of the support shaft until a stop of the piston of the one displacement guide abuts against a delimiter of the hollow cylinder of the one displacement guide and both displacement guides are displaceable together at the predefined distance with respect to one another along the longitudinal direction of the support shaft, whilst the stop of the piston of the one displacement guide abuts against the delimiter of the hollow cylinder of the one displacement guide.

15. The conveyor belt stripping device according to claim 14, wherein each hollow cylinder extends over the entire length, running in the longitudinal direction of the support shaft, of one of the longitudinal sides of the associated displacement guide and in that the extension of each piston is longer in the longitudinal direction of the support shaft than the predefined distance.

16. The conveyor belt stripping device according to claim 1, wherein the connection device for the two displacement guides comprises two connection plates which are connected together in an articulated manner, in that the one connection plate is fixed rotatably to the one displacement guide and the other connection plate is fixed rotatably to the other displacement guide.

17. The conveyor belt stripping device according to claim 1, wherein the conveyor belt stripping device comprises an actuating device for displacing the displacement guides in the longitudinal direction of the support shaft.

18. The conveyor belt stripping device according to claim 17, wherein the actuating device interacts with the connection device.

19. The conveyor belt stripping device according to claim 1, wherein the displacement guides are realized as a hollow profile or a T-profile foot which is open on one side.

20. The conveyor belt stripping device according to claim 1, wherein the displacement guides comprise an adapter for the attachment of a specific stripping segment, in particular a standard stripping segment.

21. A displacement guide for the attachment of stripping segment to support shaft of a conveyor belt stripping device, wherein the displacement guide, is connectable to the stripping segment, is attachable to the support shaft in a positive locking manner so as to transmit torque, and is displaceable in a longitudinal direction of the support shaft once a fastening device of the conveyor belt stripping device has been released, wherein the displacement guide is operatively couplable in the longitudinal direction of the support shaft with a displacement guide, which is arranged next to the displacement guide on the support shaft, by means of a connection device, the displacement guide, in the state coupled with the adjacent displacement guide, is displaceable to a predefined distance from the adjacent displacement guide along the longitudinal direction of the support shaft and then is displaceable at the predefined distance to the adjacent displacement guide together with the adjacent displacement guide along the longitudinal direction of the support shaft on account of the coupling by means of the connection device, wherein the connection device comprises two connection elements, in that the one connection element extends from a longitudinal side of the displacement guide to the adjacent displacement guide, and in that the other connection element extends from the other longitudinal side of the displacement guide to the adjacent displacement guide.

22. The displacement guide according to claim 21, wherein the connection element or both connection elements is/are in each case a chain or a cable.

23. The displacement guide according to claim 21, wherein the connection device has on the displacement guide a bolt and a connection element which extends from the displacement guide to the adjacent displacement guide when the displacement guide abuts against the adjacent displacement guide, in that the connection element comprises a recess which, in the state coupled with the adjacent displacement guide, receives the bolt of the adjacent displacement guide in such a manner that the bolt of the adjacent displacement guide is displaceable in the recess of the connection element of the displacement guide along the longitudinal direction of the support shaft by the predefined distance and forms a stop for the bolt of the adjacent displacement guide so that the displacement guide is displaceable together with the adjacent displacement guide at the predefined distance with respect to one another along the longitudinal direction of the support shaft.

24. The displacement guide according to claim 21, wherein the connection device has a hollow cylinder on the displacement guide and a piston arranged therein, in that the piston is movable relative to the hollow cylinder, in that the piston is coupled with the hollow cylinder of the adjacent displacement guide in such a manner that the displacement guide is slidable away from the adjacent displacement guide along the longitudinal direction of the support shaft until a stop of the piston abuts against a delimiter of the hollow cylinder and the displacement guide is displaceable together with the adjacent displacement guide together at the predefined distance with respect to one another along the longitudinal direction of the support shaft, whilst the stop of the piston abuts against the delimiter of the hollow cylinder.

25. The displacement guide according to claim 24, wherein the hollow cylinder extends over the entire length, running in the longitudinal direction of the support shaft, of one of the longitudinal sides of the displacement guide and in that the extension of the piston is longer in the longitudinal direction of the support shaft than the predefined distance.

26. The displacement guide according to claim 21, wherein the connection device for the displacement guide comprises two connection plates which are connected together in an articulated manner, in that the one connection plate is fixed rotatably to the displacement guide and the other connection plate is fixed rotatably to the adjacent displacement guide.

* * * * *